(12) United States Patent
Bjerkholt

(10) Patent No.: US 8,599,644 B2
(45) Date of Patent: Dec. 3, 2013

(54) VELOCITY MODELS FOR A SINGLE WELL AND FOR A SET OF WELLS

(75) Inventor: Børre Bjerkholt, Langhus (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 578 days.

(21) Appl. No.: 12/852,004

(22) Filed: Aug. 6, 2010

(65) Prior Publication Data

US 2010/0299117 A1    Nov. 25, 2010

Related U.S. Application Data

(63) Continuation-in-part of application No. 12/684,242, filed on Jan. 8, 2010.

(60) Provisional application No. 61/149,884, filed on Feb. 4, 2009, provisional application No. 61/294,701, filed on Jan. 13, 2010.

(51) Int. Cl.
*G01V 1/00* (2006.01)
*G01V 1/30* (2006.01)

(52) U.S. Cl.
CPC . *G01V 1/00* (2013.01); *G01V 1/303* (2013.01)
USPC .............................................. 367/73; 367/38

(58) Field of Classification Search
USPC ..................................................... 367/38, 73
See application file for complete search history.

(56) References Cited

U.S. PATENT DOCUMENTS

| 5,570,321 | A | * | 10/1996 | Bernitsas | 367/38 |
| 5,648,937 | A | * | 7/1997 | Campbell | 367/27 |
| 5,754,493 | A | * | 5/1998 | Al-Chalabi | 367/38 |
| 6,101,447 | A | | 8/2000 | Poe, Jr. | |
| 6,351,991 | B1 | | 3/2002 | Sinha | |
| 6,678,616 | B1 | | 1/2004 | Winkler | |
| 7,054,753 | B1 | | 5/2006 | Williams et al. | |
| 7,418,865 | B2 | | 9/2008 | Griffiths | |

(Continued)

FOREIGN PATENT DOCUMENTS

GB        2359135 A        8/2001

OTHER PUBLICATIONS

Legge, J. A. & Rupnik, J. J., "Least Squares Determination of the Velocity Function V=Vo+kz for Any Set of Time Depth Data", Geophysics, 1943, pp. 356-361, vol. 8.*

(Continued)

*Primary Examiner* — Krystine Breier
(74) *Attorney, Agent, or Firm* — Lam Nguyen; Rodney Warfford

(57) ABSTRACT

Systems and methods create velocity models for a single well or for a set of wells. In one implementation, a system optimizes a time-depth relationship applied to data points from a single well to estimate coefficients for a linear-velocity-in-time function that models the data points. The system optimizes by reducing the influence of outlier data points, for example, by weighting each data point to decrease the influence of those far from the velocity function. The system also reduces the influence of top and bottom horizons of geological layers by applying data driven techniques that estimate the velocity function in a way that reduces dependence on the boundary conditions. The systems and methods can also create velocity models based on data from a set of wells, applying a well weights method to reduce the influence of outlier wells and thereby prevent wells with aberrant data from degrading a correct velocity model.

20 Claims, 17 Drawing Sheets

(56) References Cited

U.S. PATENT DOCUMENTS

| | | |
|---|---|---|
| 7,457,195 B2 | 11/2008 | Jones |
| 2006/0047429 A1 | 3/2006 | Adams |
| 2010/0195437 A1 | 8/2010 | Bjerkholt |
| 2010/0195440 A1 | 8/2010 | Bjerkholt |
| 2010/0254220 A1 | 10/2010 | Tulett |

OTHER PUBLICATIONS

Slotnick, M. M., 1936a, On seismic computations, with application: Part I, Geophysics, 1, 9-22.

J. A. Legge and J. J. Rupnik, 1943, Least squares determination of the velocity function $v=v0+kz$ for any set of time depth data, Geophysics, 8, 356-361.

Al-Chalabi, M., 1997a, Instantaneous slowness versus depth functions, Geophysics, vol. 62, No. 1, 270-273.

Al-Chalabi, M., 1997a, Parameter nonuniqueness in velocity versus depth functions, Geophysics, vol. 62, No. 3, 970-979.

D. Marsden, M. D. Bush, D. S. Johmg, 1995, Analytic velocity functions, The Leading Edge, 775-782.

\* cited by examiner

VELOCITY MODELS FOR A SINGLE WELL AND FOR A SET OF WELLS

RELATED APPLICATIONS

This continuation-in-part patent application claims the benefit of priority to U.S. patent application Ser. No. 12/684,242 to Bjerkholt entitled, "Velocity Model for Well Time-Depth Conversion," filed Jan. 8, 2010, and incorporated herein by reference in its entirety, which in turn claims priority to U.S. Provisional Patent Application No. 61/149,884 to Bjerkholt, entitled, "Well Time-Depth Relationship Estimation," filed Feb. 4, 2009, and incorporated herein by reference in its entirety; and claims benefit of priority to U.S. Provisional Patent Application No. 61/294,701 to Bjerkholt, entitled, "TDR Estimation for a Set of Wells," filed Jan. 13, 2010, and incorporated herein by reference in its entirety.

BACKGROUND

Petroleum geology and oil exploration often apply reflection seismology to estimate underground features and thereby model the properties of a subsurface earth volume. A seismic source provides acoustic waves (i.e., "sound," vibrations, or seismic waves). Subsurface features reflect the acoustic waves. A measurement of the time interval between transmission of the acoustic input and its arrival at a receiver enables estimation of the depth of the feature that reflected the sound or vibration.

When an acoustic wave impinges a boundary between two different subsurface materials that have different acoustic transparencies and acoustic impedances, some of the energy of the acoustic wave is transmitted or refracted through the boundary, while some of the energy is reflected off the boundary.

Depth conversion, as a part of the reflection seismology process and analysis, converts the acoustic wave travel time to actual depth, based at least in part on the acoustic velocity property of each subsurface medium (e.g., rock, sediment, hydrocarbon, water). This depth conversion makes possible a model. The model may have depth and thickness maps of subsurface layers interpreted from the seismic reflection data, and in turn the model enables volumetric evaluation of hydrocarbons, e.g., gas or oil, in their natural place.

In reflection seismology, the collected experimental data may be well data points, recorded seismograms, and so forth, and the desired result is the model of the physical structure and relevant properties of the subsurface earth volume. Models worked up from reflection seismology are usually very sensitive to small errors in the collected data or errors in the processing of the data. Such models that interpret experimental data collected from reflection seismology are often tentative and not very robust. Two specific sources of inaccuracy in modeling a subsurface volume from reflection seismology data are outlier values in the data and the influence of layer boundary conditions, i.e., uncertainty in the location of the tops and bases of horizons.

SUMMARY

Systems and methods create velocity models for a single well or for a set of wells. In one implementation, a system optimizes a time-depth relationship applied to data points from a single well to estimate coefficients for a linear-velocity-in-time function that models the data points. The system optimizes by reducing the influence of outlier data points, for example, by weighting each data point to decrease the influence of those far from the velocity function. The system also reduces the influence of top and bottom horizons of geological layers by applying data driven techniques that estimate the velocity function in a way that reduces dependence on the boundary conditions. The systems and methods can also create velocity models based on data from a set of wells, applying a well weights method to reduce the influence of outlier wells and thereby prevent wells with aberrant data from degrading a correct velocity model.

This summary section is not intended to give a full description of a velocity models for a single well and for a set of wells, or to provide a comprehensive list of features and elements. A detailed description with example implementations follows.

DETAILED DESCRIPTION

Overview

This disclosure describes systems and methods for making and using velocity models for a single well or for a set of wells. In one implementation, an example system improves the accuracy of data fitting and modeling by deemphasizing outlier data values and the influence of layer boundaries on the velocity model for time-depth conversion.

An example system receives data from a single well for creating the velocity model for time-depth conversion, applies a time-depth relationship (TDR) to the data for estimating an unknown coefficient in a linear-velocity-in-time function to fit the data, and optimizes the time-depth relationship to improve estimation of the coefficients. "Optimize," as used herein, means variously "to improve," "to make better," or to "make best." Related systems and methods for applying TDR estimation to data from a single well in order to estimate unknown coefficients in a linear-velocity-in depth function (as compared with the linear-velocity-in-time function are described in U.S. patent application Ser. No. 12/684,242 cited above, which is incorporated by reference herein.

Figure 1:
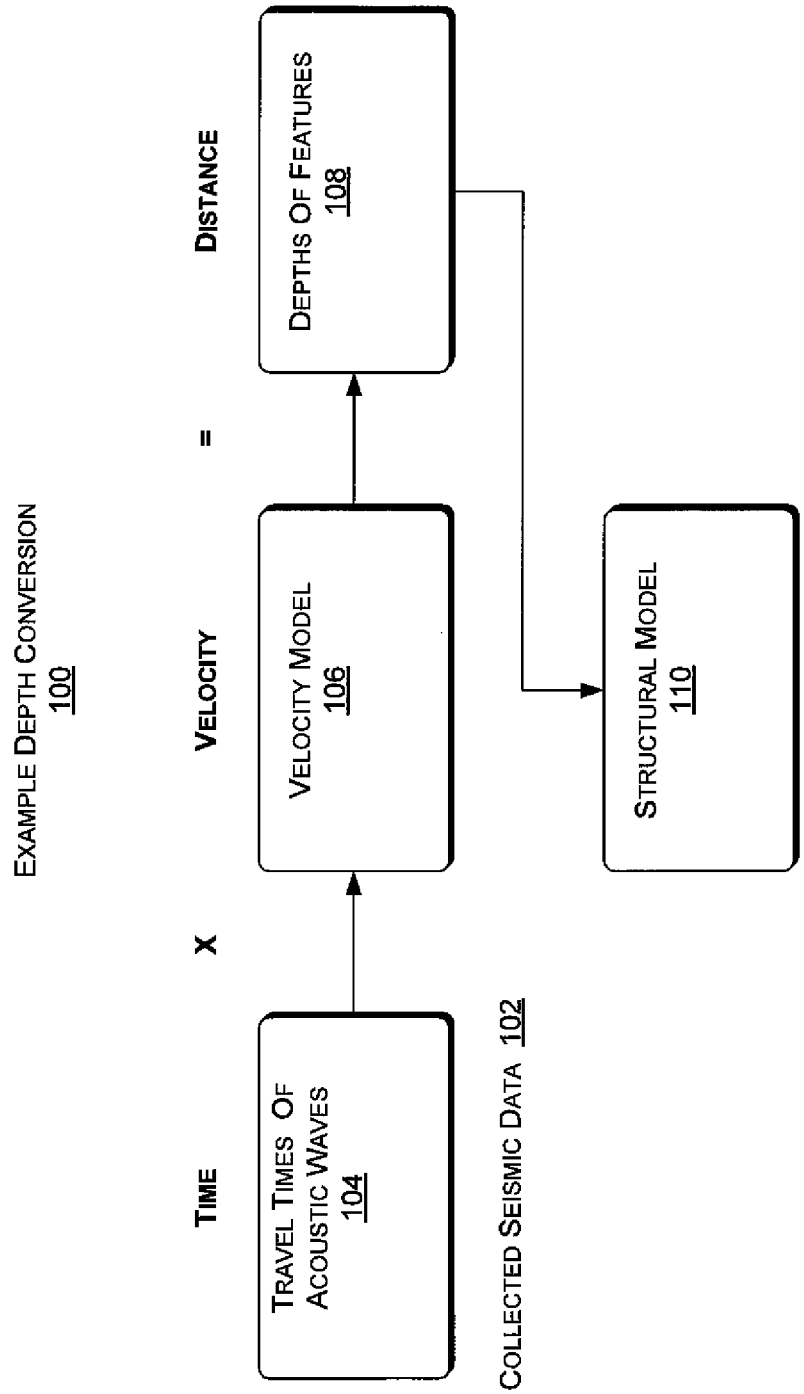
FIG. 1 is a diagram of example depth conversion that can be used in generating a structural model of a subsurface earth volume.

In FIG. 1, time-depth conversion, ("depth conversion 100"), as a part of the reflection seismology process, receives collected seismic data 102 and converts acoustic wave travel times 104 via a velocity model 106 to estimated depths of features 108, based at least in part on the acoustic velocity property of each subsurface medium (rock layers, sediment layers, hydrocarbon fields, water, etc.). This depth conversion enables the creation of a structural model 110 that maps depth and thickness of subsurface layers interpreted from the seismic reflection data, and enables volumetric evaluation of hydrocarbons as they exist below the surface.

This description utilizes the linear-velocity-in-time function $v=v_0+kt$, where $v_0$ is the instantaneous velocity at a data point and k is the rate of increase of velocity (compaction factor) per depth thereafter. The example system to be described below uses the time-depth relationship (TDR) in a single well to estimate unknown coefficients in the linear-velocity-in-time function. Then, innovative techniques also described herein make maximum use of well data, while providing mathematical robustness and tolerance of real-world levels of noise in the data.

The example system achieves mathematical robustness and tolerance of noise in the data by minimizing the influence of outlier values in the data and also by reducing the influence of layer boundary conditions (top and base horizons) on velocity modeling. In one implementation, the system uses data weights to reduce the influence of outlier values. In another implementation, the system also applies data driven methods to reduce the influence of the boundary conditions, i.e., of the top and base horizons. To reduce the influence of boundary conditions, the system may apply an optimize-for-estimation-of-k technique, and/or an estimate-and-adjust-to-base method.

The following is a list of symbols used in the description below.

t=One-way travel time measured from datum.
$t_c$=One-way travel time boundary value measured from datum.
$t_T$=One-way travel time at the top of the layer measured from datum.
$t_B$=One-way travel time at the bottom of the layer measured from datum.
$t_M$=One-way travel time of the well marker measured from datum.
$\bar{t}$=The average one-way travel time measured from datum.
z=Depth measured from datum.
$z_c$=Depth boundary value measured from datum.
$z_T$=Depth at the top of the layer measured from datum.
$z_M$=Depth of the well marker measured from datum.
$\hat{Z}$=Fitted depth value measured from datum.
v=Instantaneous velocity.
$v_0$=Instantaneous velocity at the datum.
k=Rate of increase of velocity (Compaction factor).
S=The summed square of residuals.
E=Measure of the quality of the fit.
m=Number of data points.
$\omega$=Final weight.
$\omega^{user}$=User defined weight.
$\omega^{robust}$=Robust weight.
r=Residual.
$r^{adj}$=Adjusted residual.
u=Standardized adjusted residual.
h=Leverage that adjust the residual by down-weighting high-leverage data points.
s=Robust variance.
K=Tuning constant.

Example Modeling Environment

Figure 2:
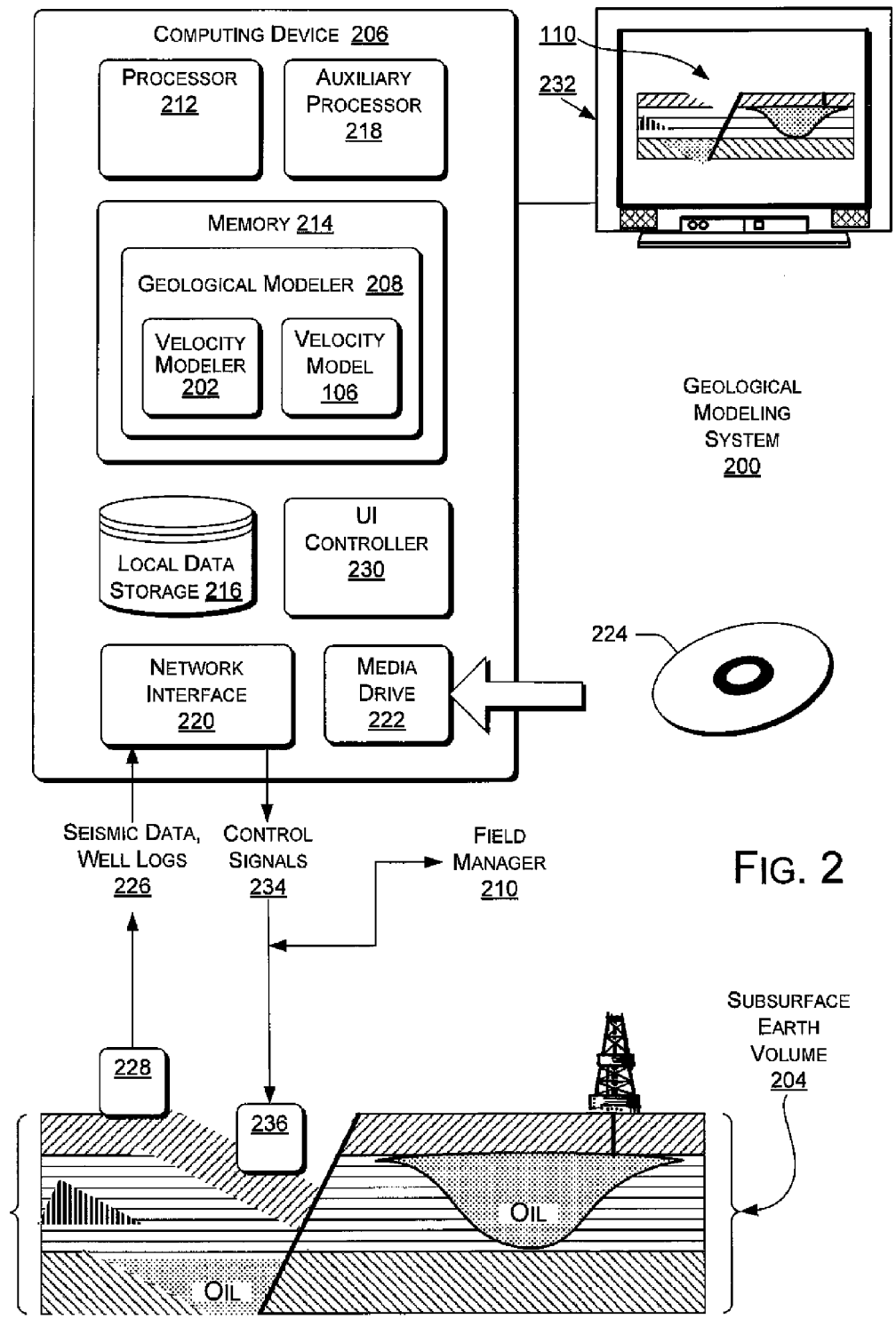
FIG. 2 is a block diagram of an example geological modeling system.

FIG. 2 shows an example geological modeling system 200 that uses an innovative velocity modeler 202 to create a structural model 110 of a subsurface earth volume 204. A computing device 206 implements components, such as a geological modeler 208 and the velocity modeler 202, to model or otherwise analogize the subsurface earth volume 204. The subsurface earth volume 204 may include, for example, a petroleum reservoir, depositional basin, or other features. The geological modeler 208 and velocity modeler 202 are illustrated as software, but can be implemented as hardware or as a combination of hardware, and software instructions.

In the illustrated example, the computing device 206 is communicatively coupled via sensory and control devices with a real-world subsurface earth volume 204, i.e., an actual earth volume, petroleum reservoir, depositional basin, oilfield, wells, surface control network, etc., and may also be in communication with one or more human agents, such as a geologist, monitor, field manager 210, etc. Although the computing device 206 is shown specifically in communication with a petroleum resource, the computing device 206 may be in communication with any subsurface earth volume 204, since the subsurface earth volume 204 being modeled may only be a candidate for petroleum production or other use.

The computing device 206 may be a computing network, computer, or other device that has a processor 212, memory 214, data storage 216, and other associated hardware such as an optional auxiliary processor 218, network interface 220 and a media drive 222 for reading and writing to a removable storage medium 224. The removable storage medium 224 can be, for example, a compact disk (CD); digital versatile disk/digital video disk (DVD); flash drive, etc., The geological modeler 208 includes the velocity modeler 202 and a resulting velocity model 106.

The removable storage medium 224 may include instructions for implementing and executing the geological modeler 208, including the velocity modeler 202. At least some parts of the velocity modeler 202 can be stored as instructions on a given instance of the removable storage medium 213, removable device, or in local data storage 216, to be loaded into memory 214 for execution by the processor(s) 212, 218.

Although the illustrated geological modeler 208 is depicted as a program residing in memory 214, the geological modeler 208 and velocity modeler 202 may also be implemented as specific hardware, such as an application specific integrated circuit (ASIC) or as a combination of hardware and software.

In this example system 200, the computing device 206 receives field data, such as seismic data and well logs 226 from a connected device 228 in communication with, and collecting data from, geophones or other sensors for a potential petroleum field or other subsurface earth volume 204, through the network interface 220. The geological modeler 208 creates a structural model 110 of the subsurface earth volume 204. A user interface controller 230 displays the structural model 110, typically on a display 232.

Based on action of the geological modeler 208 and the velocity modeler 202, the computing device 206 can generate control signals 234 to be used via control devices 236 in real world prospecting, modeling, exploration, prediction, and/or control of resources, such as petroleum production, including direct control via hardware control devices 236 of such machinery and hardware as injection and production wells, reservoirs, fields, transport and delivery systems, and so forth.

Example Engine

Figure 3:
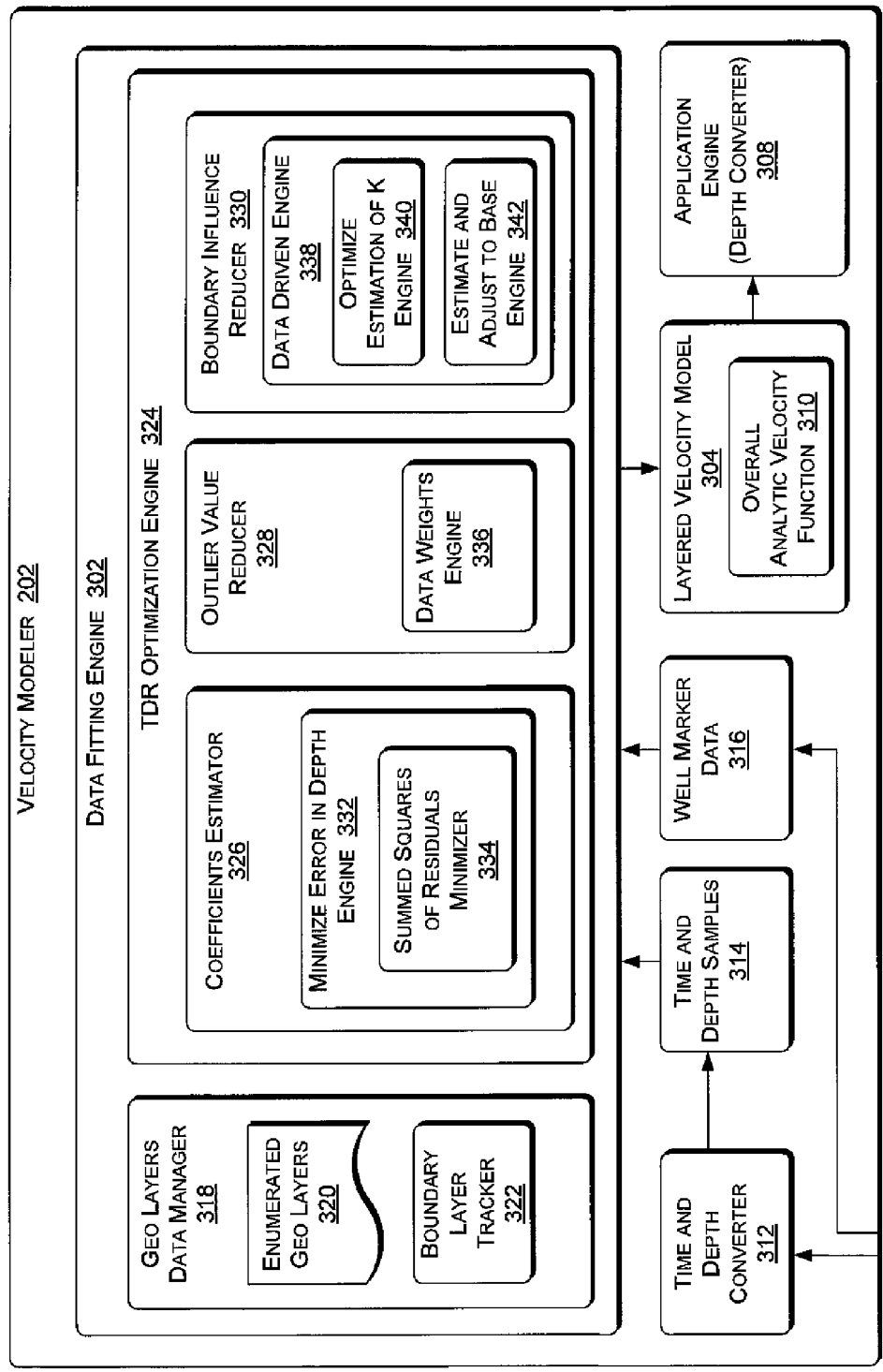
FIG. 3 is a block diagram of an example velocity modeler introduced in FIG. 2, in greater detail.

FIG. 3 shows the example velocity modeler 202 of FIG. 2, in greater detail. The illustrated implementation is only one example configuration, to introduce features and components of an engine that performs innovative velocity modeling. Many other arrangements of the components of a velocity modeler 202 are possible within the scope of the subject matter. As introduced above, the velocity modeler 202 can be implemented in hardware, or in combinations of hardware and software. Illustrated components are communicatively coupled with each other for communication and data exchange as needed.

Providing a list of example components, the illustrated velocity modeler 202 includes a data fitting engine 302 that generates a velocity model 304 based on collected data 306 that is input to the velocity modeler 202. An application engine 308, in turn, may use the velocity model 304 to create a structural model 110 of the subsurface earth volume 204 based on the collected data 306. A given velocity model 304 may be retained to process subsequently collected data 306 into a structural model 110. The velocity model 304 may include an analytic velocity function 310 that optimizes time-depth conversion for subsequently collected data 306 from the subsurface earth volume 204 at hand.

The collected data 306 may consist of seismic information, seismograms, well markers, and so forth. A time-and-depth converter 312 may perform an initial TDR conditioning of raw data to provide time-and-depth samples 314. The collected data 306 may also provide well marker data 316 as input for the data fitting engine 302.

The data fitting engine 302 includes components to find optimized velocity functions to fit the data points represented in the collected data 306. That is, the data fitting engine 302 finds better coefficients for the linear-velocity-in-time function than conventional techniques.

A geological layers data manager 318 in the data fitting engine 302 may list enumerated geological layers 320 of the subsurface earth volume 204 being modeled, and may also include a boundary layer tracker 322 that marks and dynamically adjusts the location of top and bottom horizons of each enumerated layer.

A time-depth relationship (TDR) optimization engine 324 in the data fitting engine 302 includes a coefficients estimator 326, an outlier value reducer 328, and a boundary influence reducer 330. The coefficients estimator includes a "minimize error in depth" engine 332 and a summed-squares-of-residuals minimizer 334. The outlier value reducer 328 includes a data weights engine 336 to decrease or nullify the effect of outlier data values that introduce an unacceptable amount of error into the velocity model 304. The boundary influence reducer 330 includes a data driven engine 338 that reduces the disproportionately large effect of small error in the measured or calculated locations of the boundaries of each subsurface layer. The data driven engine 338 includes an "optimize estimation of k" engine 340 and an "estimate and adjust to base" engine 342.

Example Operation of the Example System and Engine

Conventional analytic velocity functions are conceptually easy to understand. Many geophysicists adopt analytic velocity functions as a preferred method of depth conversion above all other techniques.

Figure 4:
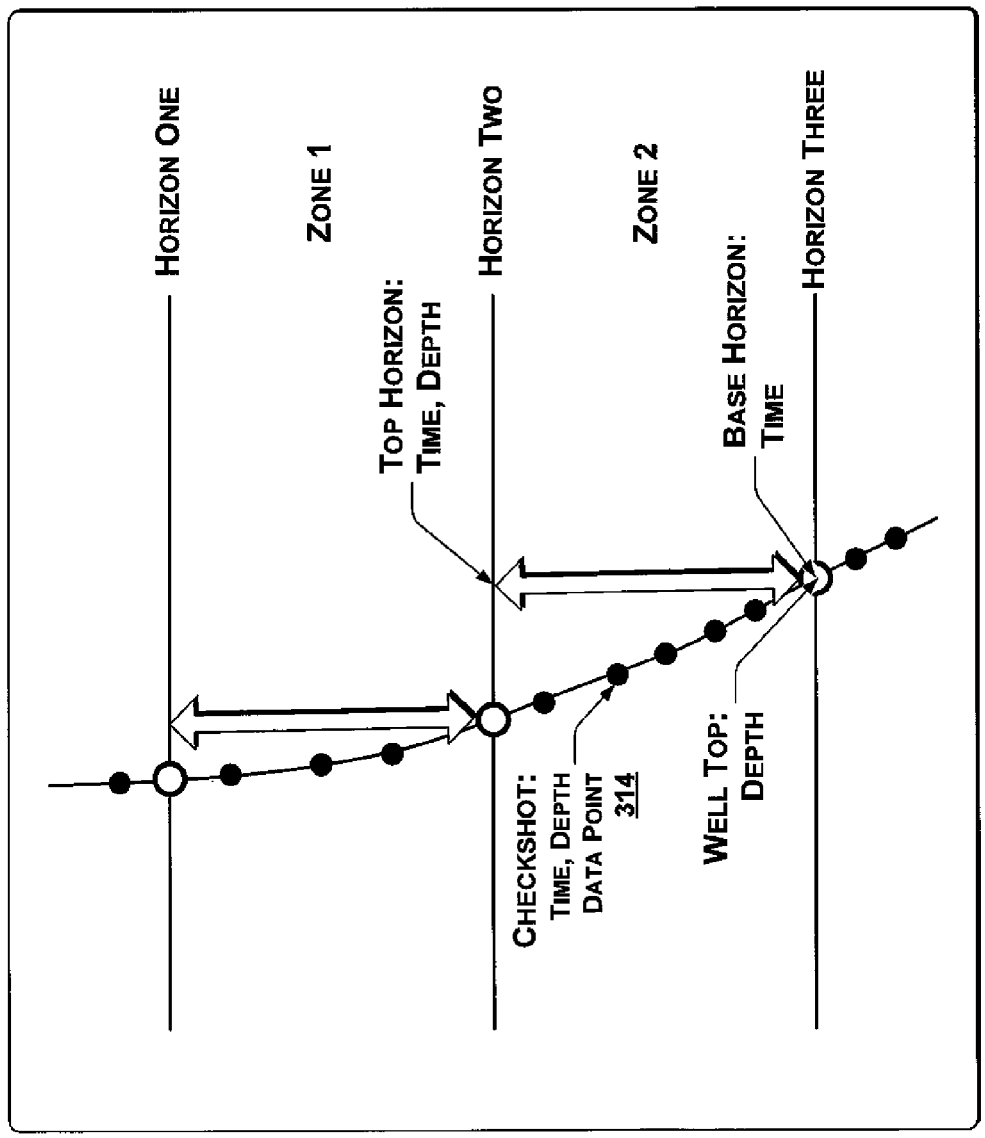
FIG. 4 is a diagram of a layer cake velocity model with horizons defined in the time domain.

In one implementation of a layer cake velocity model, such as velocity model 304, the model is divided into separate geological layers, each of which usually has a different, but internally consistent velocity function. FIG. 4 shows a layer cake velocity model with horizons defined in the time domain. A separate velocity function is used in each layer, and the depth at the base of the layer can be calculated by the velocity function given at the top of the layer. Each velocity function contains some coefficients. Referring to both FIGS. 3 and 4, these coefficients are estimated so that the analytic velocity function follows the trend in the set of time-and-depth samples 314. In one implementation, the time-and-depth converter 312 applies the time-depth relationship (TDR) to collected data 306 from a well, providing input for generating the velocity model 304 from various measures of time-and-depth. The TDR optimization engine 324 also applies a TDR estimation algorithm to estimate the unknown coefficients of the velocity function for each layer. The output of the overall process is a velocity model 304 that the velocity modeler 202 (or the geological modeler 208) can use to convert from time to depth, or vice versa.

Each layer in a velocity model 304 is dependent on the layer above, so that inaccurate velocity modeling in one layer usually results in even greater inaccuracy in the layers below. Even when the analytic velocity functions 310 exactly fit the time versus depth data 314 for some specific wells, this fit does not necessarily mean that the velocity model 304 is robust. An improved velocity model 304 should also predict locations far from any wells in a correct manner.

Figure 5:
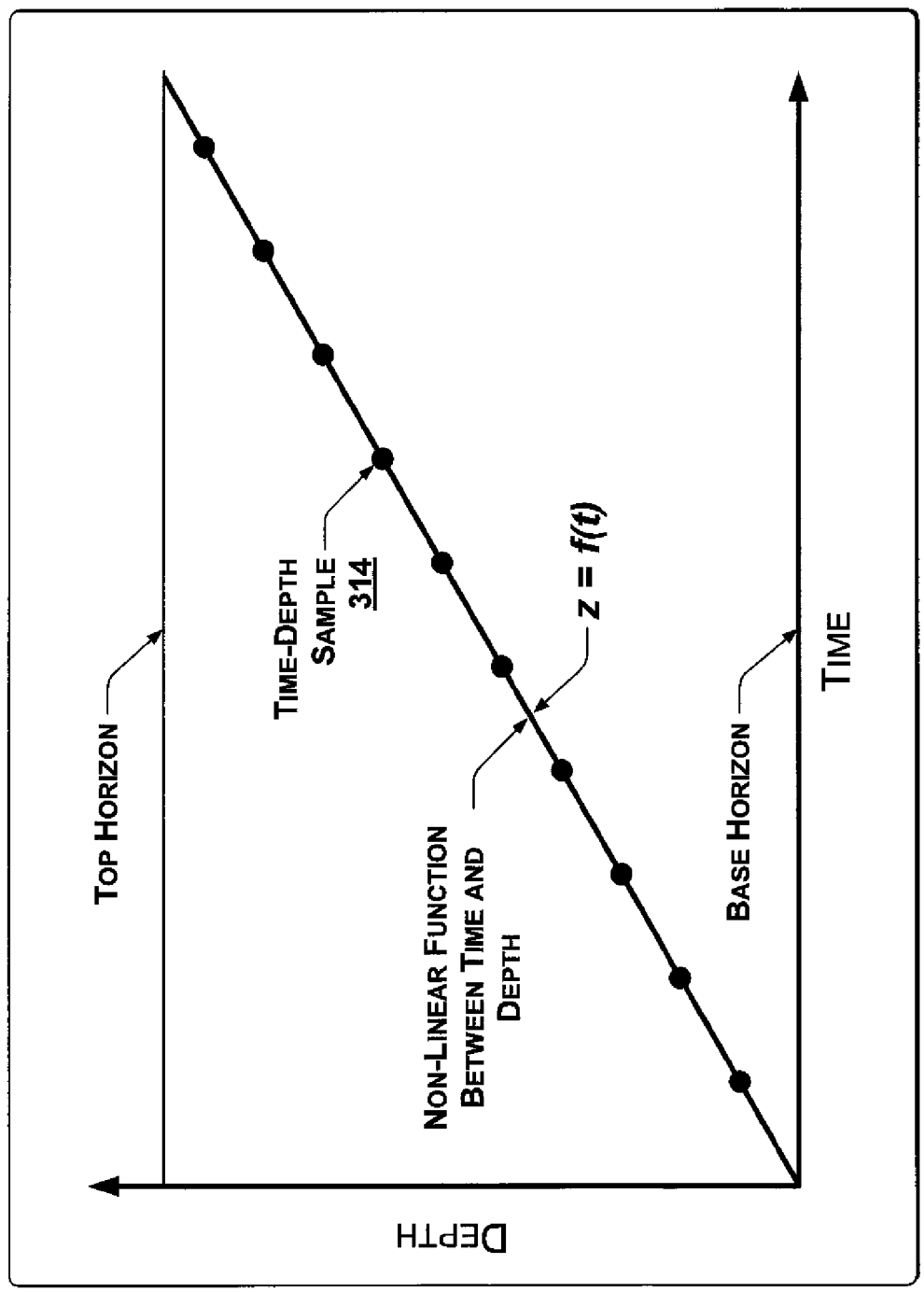
FIG. 5 is a diagram of estimated analytic time-depth function plotted against input data.

There are ways to select the best velocity function. A simple way to check the correctness of a velocity function is to calculate the depth the velocity function predicts for a well marker 316. However, many different functions can calculate the correct depth. In one implementation, to find the best velocity function for robustness the best function is one that gives the best time-depth relationship in a given layer, and also follows the correct trend in velocity for that layer. FIG. 5 shows an estimated analytic time-depth function plotted against the input data.

To estimate the coefficients for the linear-velocity-in-time function, many different methods to find the best combination of coefficients have been tried by various researchers. Some methods minimize error in velocity and others minimize error in the depth. These methods usually assume that the response errors follow a normal distribution, and that extreme values are rare. Still, extreme values called outliers do occur.

Figure 6:
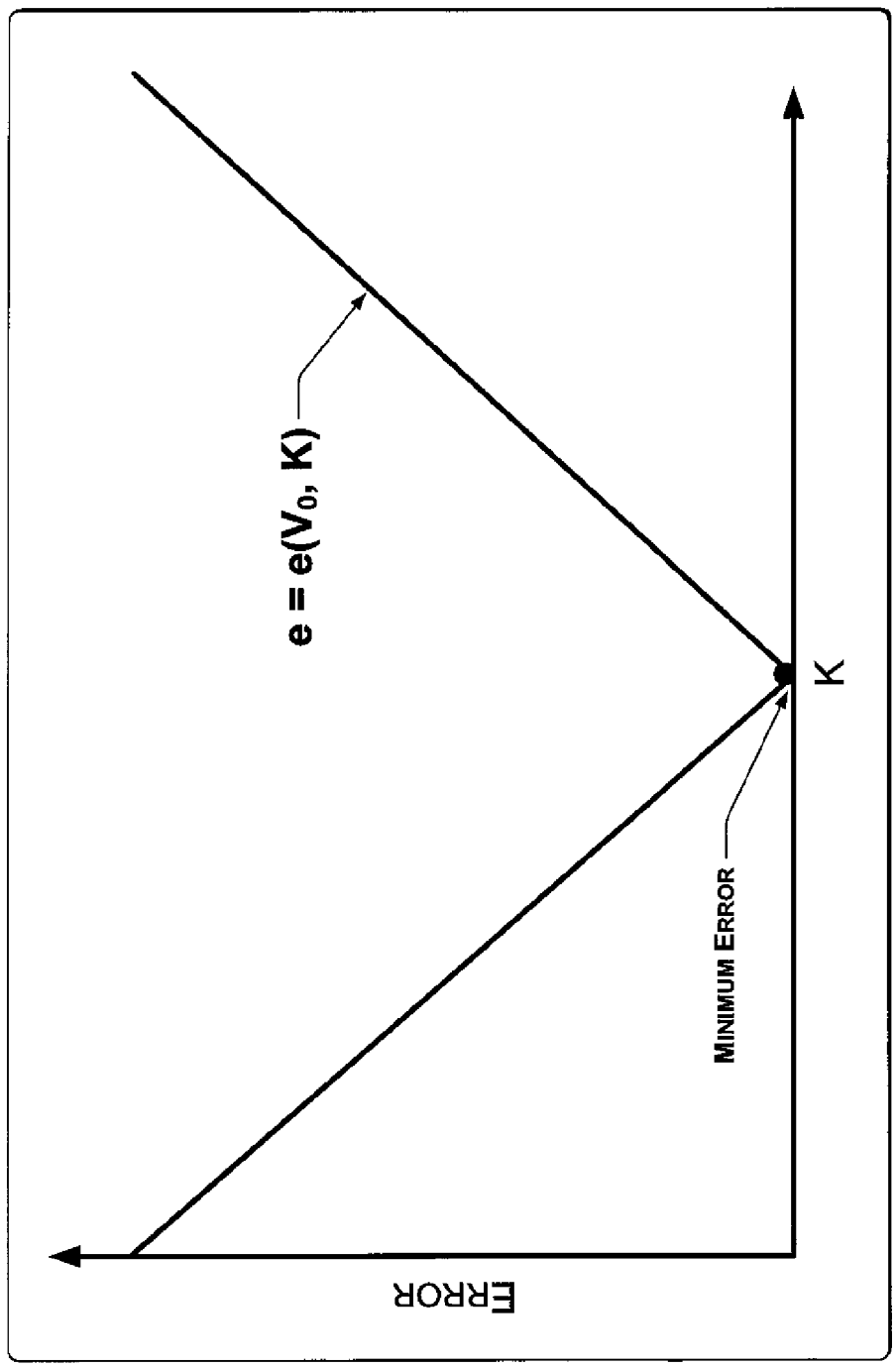
FIG. 6 is a diagram of calculated error between time-depth samples and an estimated function.

The coefficients estimator 326 in FIG. 3 uses a minimum-error-in-depth engine 332. However, an implementation that minimizes error of velocity can also be used with very little change to the layout shown in FIG. 3. FIG. 6 shows calculated error between the time-depth samples 314 and the estimated function. The coefficients estimator 326 aims to find the coefficients that provide the minimum error between time-depth samples 314 and the velocity function modeling the time-depth samples 314.

TDR Estimation for One Well

In one implementation, the velocity modeler 202 uses the time-depth relationship (TDR) in a single well to estimate the unknown coefficients in a single analytic velocity function. The analytic linear velocity in time function is shown in Equation (1):

$$v = v_0 + kt \tag{1}$$

where $v_0$ is the instantaneous velocity at a data point and k is the rate of increase of velocity (compaction factor). As described in Appendix A, the depth z can be expressed as a function of time t, as in Equation (2):

$$z = z_c + v_0(t - t_c) + \frac{1}{2}k(t^2 - t_c^2) \tag{2}$$

where $t_c$ and $z_c$ are the time-and-depth boundary values. It is common to set the boundary values equal to the time-and-depth at the top of the layer ($t_c = t_T$ and $z_c = z_T$).

In one implementation, the coefficients estimator 326 applies a standard method of estimating the best combination of coefficients via the summed-squares-of-residuals-minimizer 334. In one implementation, the summed square of residuals is given by Equation (3):

$$S = \sum_{j=1}^{m} r_j^2 \tag{3}$$

where r is the residual and m is the number of data points. A measure of the quality of the fit is desirable and can be obtained from standard deviation as given in Equation (4):

$$E = \sqrt{\frac{S}{m}} \tag{4}$$

The minimum-error-in-depth engine 332 minimizes the error in depth. The depth residual is then given by Equation (5)

$$r = z - \hat{z} \tag{5}$$

where z is the observed depth value and $\hat{z}$ is the fitted depth value.

In one scenario, there is well marker data 316 and input time-and-depth data points 314. By inserting functions from Equation (5) and Equation (2) into Equation (3), the summed-squares-of-residuals-minimizer 334 calculates a summed squares residuals, which can be written as in Equation (6):

$$S = \sum_{j=1}^{m} \left(v_0 \alpha_j + \frac{1}{2} k \alpha_j \gamma_j \beta_j\right)^2 \tag{6}$$

$$\beta_j = z_j - z_c, \ \alpha_j = t_j - t_c, \ \gamma_j = t_j + t_c$$

where $t_j$ and $z_j$ are the input time-and-depth data 314. To find the combination of $v_0$ and k that gives the minimum error in depth, the minimum-error-in-depth engine 332 finds the minimum of the function in Equation (6). In this process, $v_0$ is found by using the function in Equation (2) with the known time at the base of the interval $t = t_B$ and the depth given by the well marker $z = z_M$. This provides the following expression for $v_0$, given in Equation (7):

$$v_0 = \frac{\beta_M}{\alpha_B} - \frac{1}{2} k \gamma_B \tag{7}$$

$$\beta_M = z_M - z_c, \ \alpha_B = t_B - t_c, \ \gamma_B = t_B + t_c$$

An expression for k is obtained by setting the partial derivative of S with respect to k equal to zero, as in Equation (8):

$$\frac{\partial S}{\partial k} = 0 \tag{8}$$

$$\frac{\partial S}{\partial k} = \sum_{j=1}^{m} \left(v_0 \alpha_j^2 \gamma_j + \frac{1}{2} k \alpha_j^2 \gamma_j^2 - \beta_j \alpha_j \gamma_j\right) \tag{9}$$

By using the functions of Equations (7), (8), and (9) a matrix system with two unknowns is obtained, as in Equation (10):

$$\begin{bmatrix} 1 & \frac{1}{2}\gamma_B \\ \sum_{j=1}^{m}(\alpha_j^2 \gamma_j) & \frac{1}{2}\sum_{j=1}^{m}(\alpha_j^2 \gamma_j^2) \end{bmatrix} \begin{bmatrix} v_0 \\ k \end{bmatrix} = \begin{bmatrix} \frac{\beta_M}{\alpha_B} \\ \sum_{j=1}^{m}(\beta_j \alpha_j \gamma_j) \end{bmatrix} \tag{10}$$

The $v_0$ and the k are found by solving this matrix system.

By inserting Equation (5) and Equation (2) into Equation (3), the summed-squares-of-residuals minimizer 334 operates according to Equation (11):

$$S = \sum_{j=1}^{m} \left(v_0 \alpha_j + \frac{1}{2} k \alpha_j \gamma_j - \beta_j\right)^2 \tag{11}$$

$$\beta_j = z_j - z_c, \ \alpha_j = t_j - t_c, \ \gamma_j = t_j + t_c$$

where $t_j$ and $z_j$ are the input time-and-depth data 314. The minimum-error-in-depth engine 332 aims to find the combination of $v_0$ and k that gives the minimum error in depth by determining the minimum of the function in Equation (11). Thus, the partial derivative of S with respect to $v_0$ and k is set equal to zero, as in Equation (12):

$$\frac{\partial S}{\partial v_0} = \frac{\partial S}{\partial k} = 0 \tag{12}$$

$$\frac{\partial S}{\partial v_0} = 2\sum_{j=1}^{m} \left(v_0 \alpha_j^2 + \frac{1}{2} k \alpha_j^2 \gamma_j - \beta_j \alpha_j\right) \tag{13}$$

$$\frac{\partial S}{\partial k} = \sum_{j=1}^{m} \left(v_0 \alpha_j^2 \gamma_j + \frac{1}{2} k \alpha_j^2 \gamma_j^2 - \beta_j \alpha_j \gamma_j\right) \tag{14}$$

The functions of Equations (12), (13), and (14) are combined to obtain a matrix system with two unknowns, as in Equation (15):

$$\begin{bmatrix} \sum_{j=1}^{m}(\alpha_j^2) & \frac{1}{2}\sum_{j=1}^{m}(\alpha_j^2\gamma_j) \\ \sum_{j=1}^{m}(\alpha_j^2\gamma_j) & \frac{1}{2}\sum_{j=1}^{m}(\alpha_j^2\gamma_j^2) \end{bmatrix} \begin{bmatrix} v_0 \\ k \end{bmatrix} = \begin{bmatrix} \sum_{j=1}^{m}(\beta_j\alpha_j) \\ \sum_{j=1}^{m}(\beta_j\alpha_j\gamma_j) \end{bmatrix} \quad (15)$$

The $v_0$ and the k are found by solving this matrix system.

Outlier Value Reduction

Figure 7:
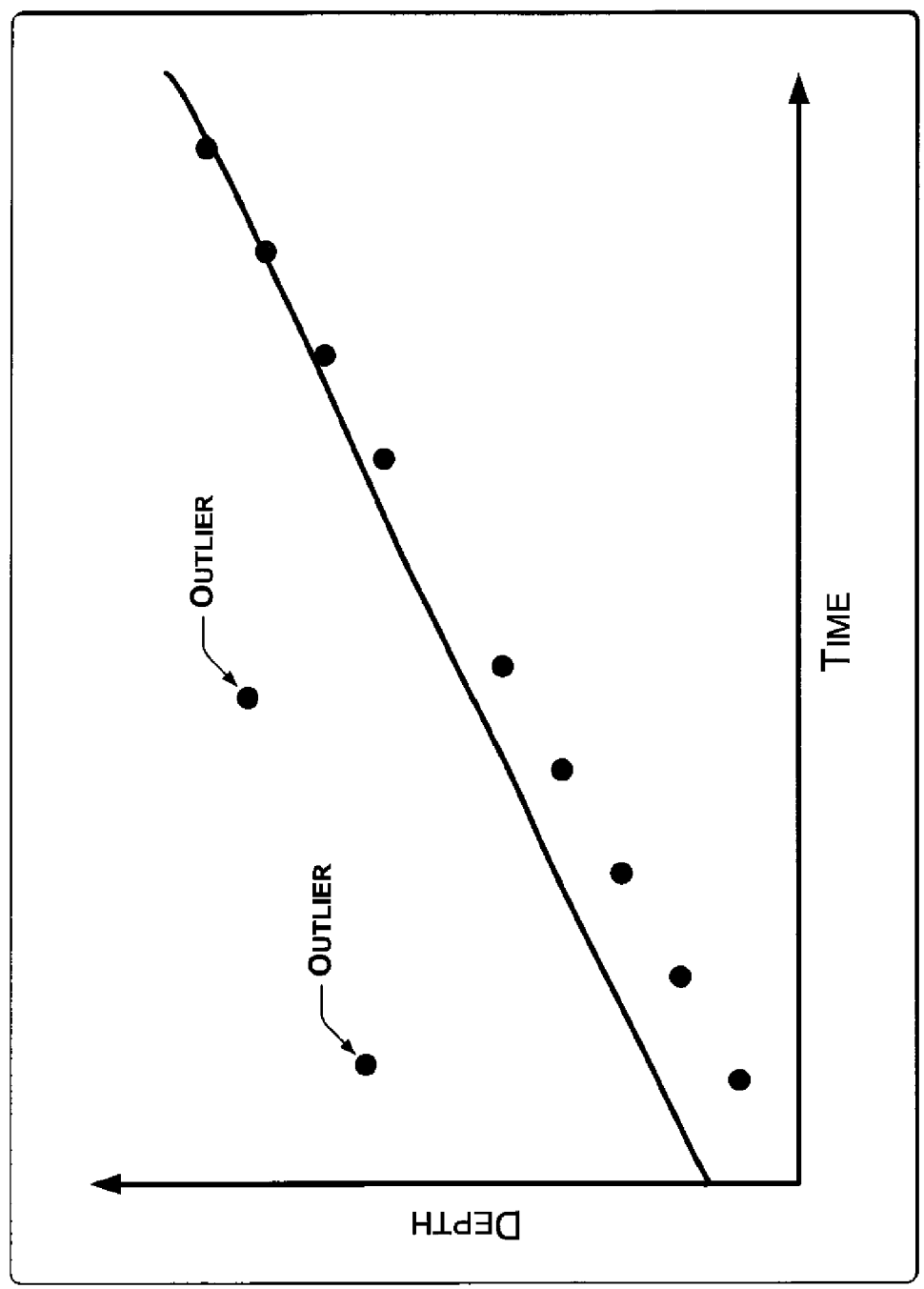
FIG. 7 is a diagram of input data that includes outlier values.

The operation of the coefficients estimator 326 performing standard methods as described thus far is very sensitive to outlier values in the input time-and-depth samples 314. Outliers have a disproportionately large influence on the data fit because squaring the residuals magnifies the effect of these extreme data points. FIG. 7 shows input data that contains outliers and the large influence that the outlier values have on the fitting of the function to the data points 314.

Figure 8:
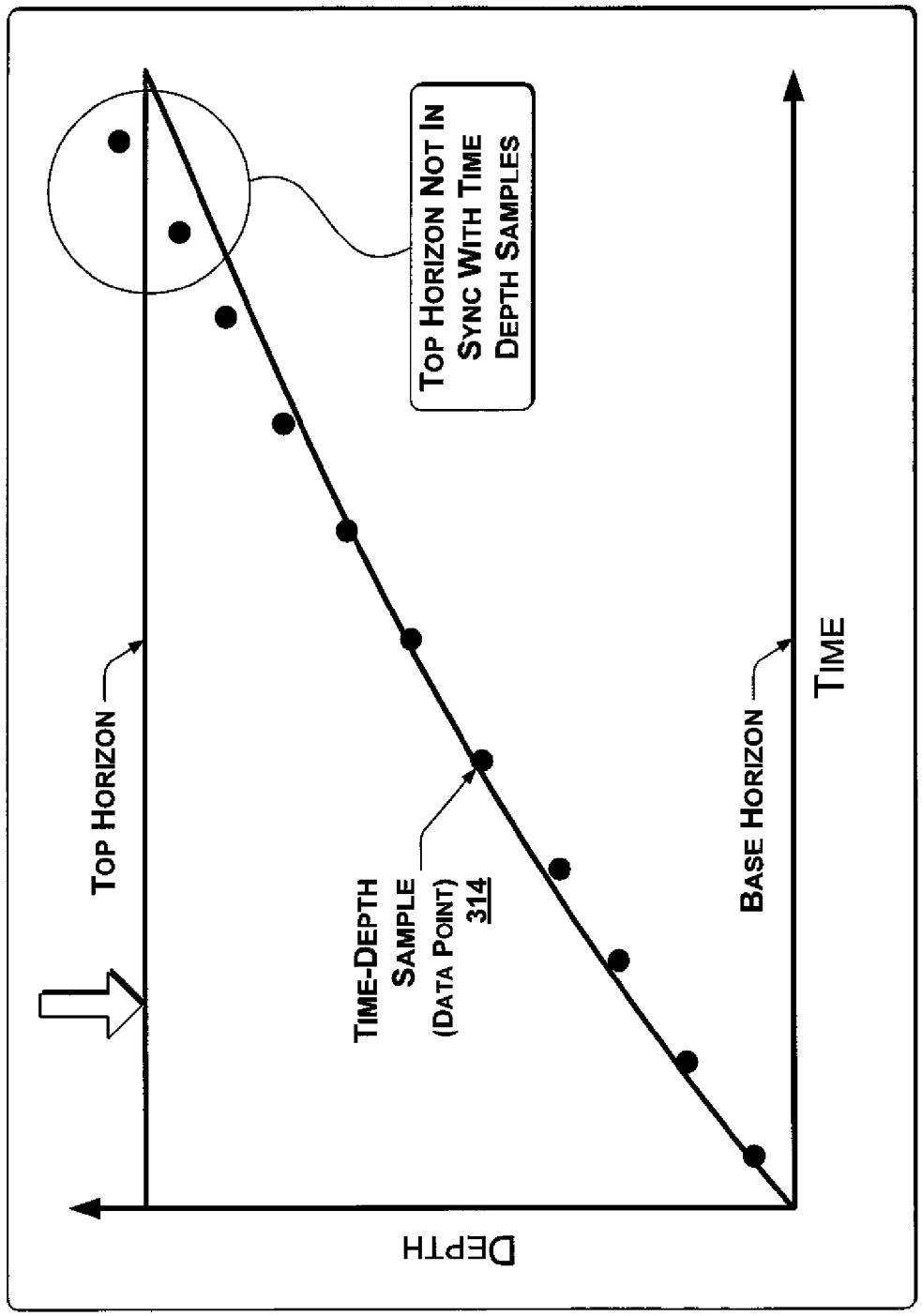
FIG. 8 is a diagram of standard TDR estimation with sensitivity to small changes in boundary conditions.

The coefficients estimator 326, as described to this point, is also very sensitive to small changes in boundary conditions (the top and base horizons). If boundary conditions are not in synchronization with the input data points 314 in one zone or layer, this can often lead to dramatic problems in the zones or layers below. FIG. 8 shows a standard TDR estimation in which the function fit is sensitive to small changes in the boundary conditions. In FIG. 8, the top horizon has been moved down a small increment, throwing the function off the data points 314.

The TDR optimization engine 324, however, generates a velocity model 304 that makes maximum use of well data, yet is still mathematically robust and tolerant of the levels of noise that realistically occur in the collected data 306. To do this the TDR optimization engine 324 includes the outlier value reducer 328 and the boundary influence reducer 330.

In one implementation, the outlier value reducer 328 includes a data weights engine 336, which performs a robust weighted-least-square operation as shown in Equation (16):

$$S = \sum_{j=1}^{m} \omega_j r_j^2 \quad (16)$$

where m is the number of data points 314, and the $\omega_j$ are weights. The weights determine how much each data point 314 influences the final parameter estimates. In one implementation, the data weights engine 336 uses a bi-square weights method that minimizes a weighted sum of squares, in which the weight given to each data point 314 depends on how far the point is from the fitted function. Points occurring near the analytic function get full weight. Points farther from the analytic function get reduced weight. Points that are father from analytic function than would be expected by random chance get zero weight. Robust fitting with bi-square weights may use an iteratively re-weighted least squares algorithm, and may follow the procedure described below in Appendix B.

When the outlier value reducer 328 works in conjunction with the coefficients estimator 326, then the minimum-error-in-depth-engine 332 uses a depth residual given by Equation (17):

$$r = z - \hat{z} \quad (17)$$

where z is the observed depth value and $\hat{z}$ is the fitted depth value.

When there are well marker 316 and input data points 314, then by inserting Equation (17) and Equation (2) into Equation (16), the summed squares of residuals is represented by Equation (18):

$$S = \sum_{j=1}^{m} \omega_j \left( v_0\alpha_j + \frac{1}{2}k\alpha_j\gamma_j - \beta_j \right)^2 \quad (18)$$

$$\beta_j = z_j - z_c, \ \alpha_j = t_j - t_c, \ \gamma_j = t_j + t_c$$

where $t_j$ and $z_j$ are the input time-and-depth data 314. The minimum of the function in Equation (18) provides the combination of $v_0$ and k that gives the minimum error in depth. In this implementation, $v_0$, is obtained by using Equation (2) with the known time at the base of the interval $t=t_B$ and the depth given by the well marker $z=z_M$. This provides the following expression for $v_0$ given in Equation (19):

$$v_0 = \frac{\beta_M}{\alpha_M} - \frac{1}{2}k\gamma_M \quad (19)$$

$$\beta_M = z_M - z_c, \ \alpha_M = t_M - t_c, \ \gamma_M = t_M + t_c$$

An expression for k is obtained by setting the partial derivative of S with respect to k equal to zero, as in Equation (20).

$$\frac{\partial S}{\partial k} = 0 \quad (20)$$

$$\frac{\partial S}{\partial k} = \sum_{j=1}^{m} \omega_j \left( v_0\alpha_j^2\gamma_j + \frac{1}{2}k\alpha_j^2\gamma_j^2 - \beta_j\alpha_j\gamma_j \right) \quad (21)$$

By combining the functions of Equations (19), (20), and (21) a matrix system with two unknowns is obtained, as in Equation (22).

$$\begin{bmatrix} 1 & \frac{1}{2}\gamma_M \\ \sum_{j=1}^{m}(\omega_j\alpha_j^2\gamma_j) & \frac{1}{2}\sum_{j=1}^{m}(\omega_j\alpha_j^2\gamma_j^2) \end{bmatrix} \begin{bmatrix} v_0 \\ k \end{bmatrix} = \begin{bmatrix} \frac{\beta_M}{\alpha_M} \\ \sum_{j=1}^{m}(\omega_j\beta_j\alpha_j\gamma_j) \end{bmatrix} \quad (22)$$

The $v_0$ and the k are found by solving this matrix system.

When there are only input data points 314 and no well marker data 316, then by inserting Equation (17) and Equation (2) into Equation (16), the summed squares of residuals can be written as in Equation (23):

$$S = \sum_{j=1}^{m} \omega_j \left( v_0\alpha_j + \frac{1}{2}k\alpha_j\gamma_j - \beta_j \right)^2, \quad (23)$$

$$\beta_j = z_j - z_c, \ \alpha_j = t_j - t_c, \ \gamma_j = t_j + t_c$$

where $t_j$ and $z_j$ are the input time-and-depth data 314. The minimum of the function in Equation (23) provides the combination of $v_0$ and k that gives the minimum error in depth. This can be accomplished by setting the partial derivative of S with respect to $v_0$ and k equal to zero, as in Equation (24).

$$\frac{\partial S}{\partial v_0} = \frac{\partial S}{\partial k} = 0 \qquad (24)$$

$$\frac{\partial S}{\partial v_0} = 2\sum_{j=1}^{m} \omega_j \left( v_0 \alpha_j^2 + \frac{1}{2} k \alpha_j^2 \gamma_j - \beta_j \alpha_j \right) \qquad (25)$$

$$\frac{\partial S}{\partial k} = \sum_{j=1}^{m} \omega_j \left( v_0 \alpha_j^2 \gamma_j + \frac{1}{2} k \alpha_j^2 \gamma_j^2 - \beta_j \alpha_j \gamma_j \right) \qquad (26)$$

Combining the functions of Equations (24), (25), and (26) provides a matrix system with two unknowns, as in Equation (27):

$$\begin{bmatrix} \sum_{j=1}^{m}(\omega_j \alpha_j^2) & \frac{1}{2}\sum_{j=1}^{m}(\omega_j \alpha_j^2 \gamma_j) \\ \sum_{j=1}^{m}(\omega_j \alpha_j^2 \gamma_j) & \frac{1}{2}\sum_{j=1}^{m}(\omega_j \alpha_j^2 \gamma_j^2) \end{bmatrix} \begin{bmatrix} v_0 \\ k \end{bmatrix} = \begin{bmatrix} \sum_{j=1}^{m}(\omega_j \beta_j \alpha_j) \\ \sum_{j=1}^{m}(\omega_j \beta_j \alpha_j \gamma_j) \end{bmatrix} \qquad (27)$$

The $v_0$ and the k are found by solving this matrix system.

Figure 9:
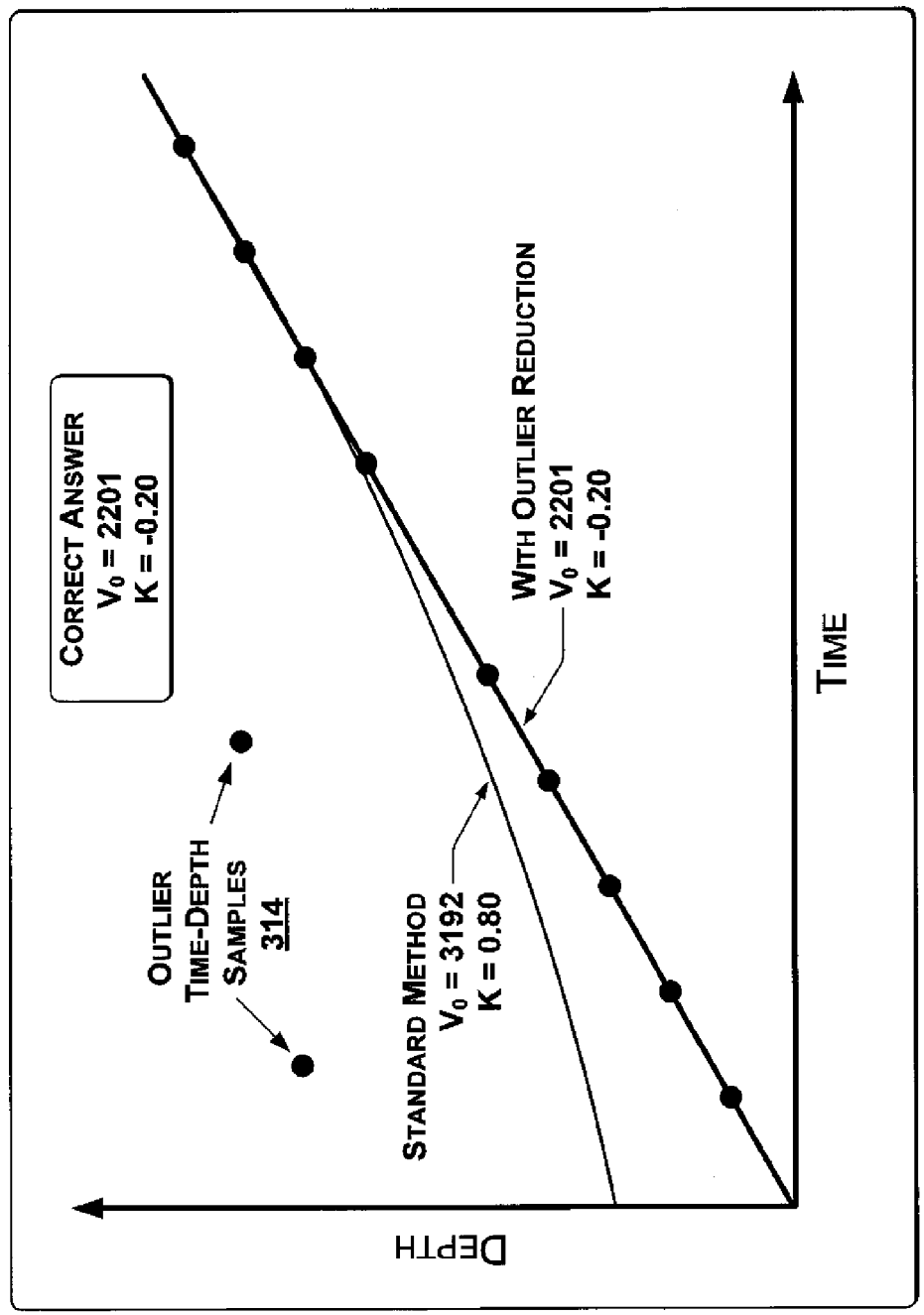
FIG. 9 is a diagram of an example velocity model created using an example data weights technique applied to input data to reduce the influence of outlier values.

FIG. 9 shows a comparison between the standard method of TDR estimation versus weighted methods applied by the data weights engine 336. The introduction of the data weights reduces the influence of outliers and provides the data fitting engine 302 with accuracy in fitting a function to the data while being much more tolerant of noise in the input collected data 306 being input.

Boundary Influence Reduction

The boundary influence reducer 330 makes the previously described components and techniques less sensitive to small changes in boundary conditions (i.e., of the tops and bases of horizons). In FIG. 9, the fitted function does not follow the trend at the top of the input data points 314 at all. This is because the top horizon is fixed and the function needs to start at the top of a horizon even if the input data points 314 indicate to start somewhere else. The boundary influence reducer 330 applies data driven techniques to reduce the influence of the horizons for the coefficients estimator 326, when it is determining the unknown coefficients.

The boundary influence reducer 330 is used in conjunction with the coefficients estimator 326. The minimum-error-in-depth-engine 332 then uses a depth residual given by Equation (28):

$$r = z - \hat{z} \qquad (28)$$

where z is the observed depth value and $\hat{z}$ is the fitted depth value.

When there are only input data points 314 and no well marker data 316, then by inserting Equation (28) and Equation (2) into Equation (16), the summed squares of residuals is given by Equation (29):

$$S = \sum_{j=1}^{m} \omega_j \left( v_0 \alpha_j + \frac{1}{2} k \alpha_j \gamma_j - \beta_j \right)^2 \qquad (29)$$

$$\beta_j = z_j - z_c, \; \alpha_j = t_j - t_c, \; \gamma_j = t_j + t_c$$

where $t_j$ and $z_j$ are the input time-and-depth data 314. In Equation (29), the boundary conditions are given by $t_c$ and $z_c$. Since the boundary influence reducer 330 aims to reduce the influence of these boundary conditions, the boundary conditions are first considered unknowns (although a top horizon and a corresponding base horizon are dependent on each other). So, instead of merely finding the combination of $v_0$ and k that provides the minimum error in depth, the coefficients estimator 326 now aims to find the combination of $v_0$, k and $z_c$ that provides the minimum error in depth. The summed-squares-of-residuals-minimizer 334 sets the partial derivative of S with respect to $v_0$ and k equal to zero, as in Equation (30): By using functions (30), (31), (32) and (33) we get a matrix system with tree unknowns.

$$\frac{\partial S}{\partial v_0} = \frac{\partial S}{\partial k} = \frac{\partial S}{\partial z_c} = 0 \qquad (30)$$

$$\frac{\partial S}{\partial v_0} = 2\sum_{j=1}^{m} \omega_j \left( v_0 \alpha_j^2 + \frac{1}{2} k \alpha_j^2 \gamma_j - \beta_j \alpha_j \right) \qquad (31)$$

$$\frac{\partial S}{\partial k} = \sum_{j=1}^{m} \omega_j \left( v_0 \alpha_j^2 \gamma_j + \frac{1}{2} k \alpha_j^2 \gamma_j^2 - \beta_j \alpha_j \gamma_j \right) \qquad (32)$$

$$\frac{\partial S}{\partial z_c} = -2\sum_{j=1}^{m} \omega_j \left( v_0 \alpha_j + \frac{1}{2} k \alpha_j \gamma_j - \beta_j \right) \qquad (33)$$

By using functions (30), (31), (32) and (33) a matrix system with three unknowns is obtained, shown in Equation (34):

$$\begin{bmatrix} \sum_{j=1}^{m}(\omega_j \alpha_j^2) & \frac{1}{2}\sum_{j=1}^{m}(\omega_j \alpha_j^2 \gamma_j) & \sum_{j=1}^{m}(\omega_j \alpha_j) \\ \sum_{j=1}^{m}(\omega_j \alpha_j^2 \gamma_j) & \frac{1}{2}\sum_{j=1}^{m}(\omega_j \alpha_j^2 \gamma_j^2) & \sum_{j=1}^{m}(\omega_j \alpha_j \gamma_j) \\ \sum_{j=1}^{m}(\omega_j \alpha_j) & \frac{1}{2}\sum_{j=1}^{m}(\omega_j \alpha_j \gamma_j) & \sum_{j=1}^{m}(\omega_j) \end{bmatrix} \begin{bmatrix} v_0 \\ k \\ z_c \end{bmatrix} = \begin{bmatrix} \sum_{j=1}^{m}(\omega_j z_j \alpha_j) \\ \sum_{j=1}^{m}(\omega_j z_j \alpha_j \gamma_j) \\ \sum_{j=1}^{m}(\omega_j z_j) \end{bmatrix} \qquad (34)$$

The $v_0$, the k, and the $z_c$ are found by solving this matrix system.

Figure 10:
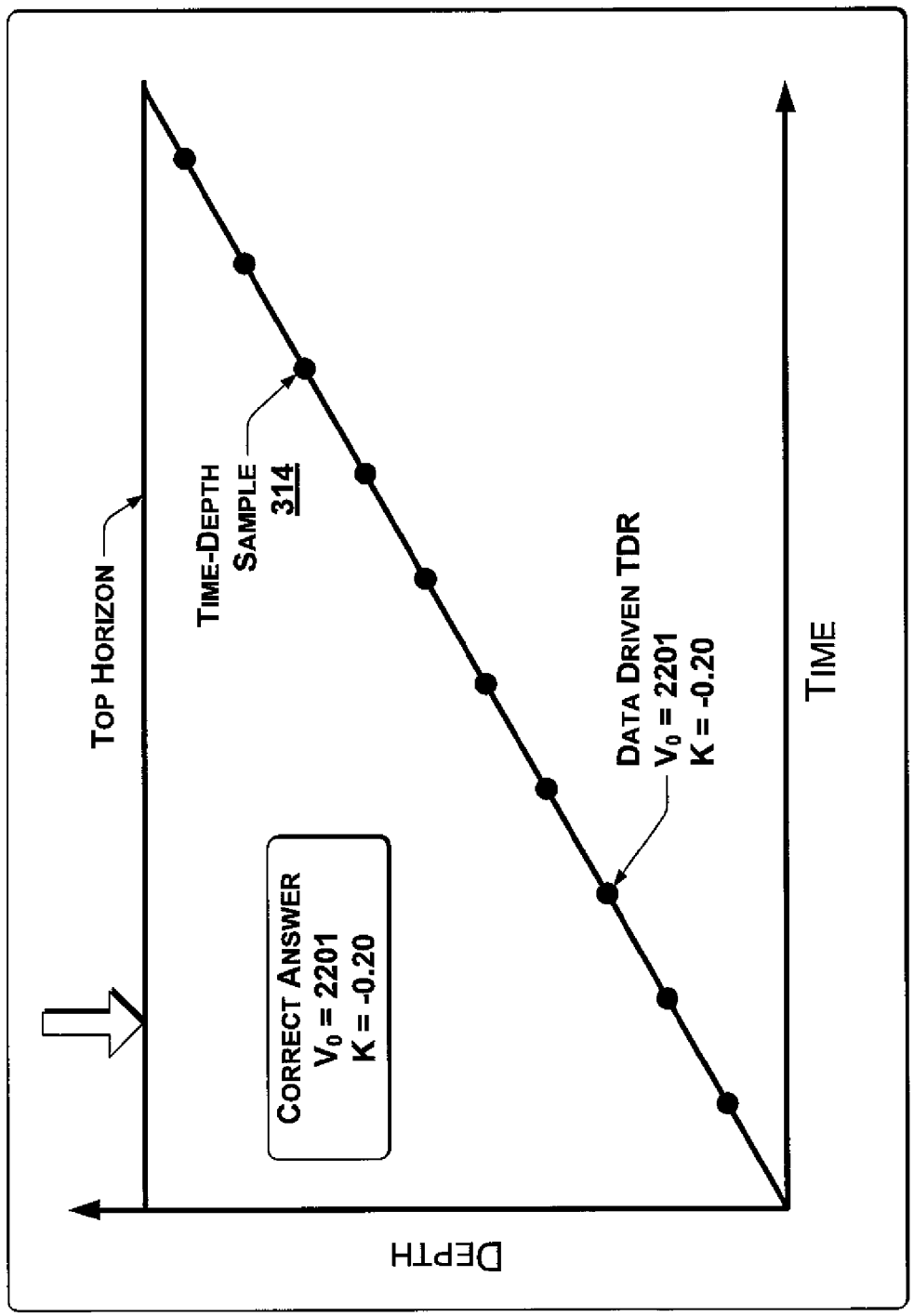
FIG. 10 is a diagram of example data driven TDR estimation that overcomes small changes in boundary conditions.

In this manner, the relationship provides estimates of $v_0$ and k that are not dependent on the boundary conditions. The data driven engine 338, when used this way, also provides the minimum error in depth, and follows the trend in velocity. In this implementation, the estimation performed by the coefficients estimator 326 is completely data driven. FIG. 10 shows that data driven TDR estimation is not sensitive to small changes in the boundary conditions. The top horizon has been moved down a small increment, yet the function is well-fitted to the data points 314. But the estimated $v_0$ and k provide a function that does not go through the boundary conditions, as shown in FIG. 10.

Optimizing Estimation of K

In the implementation just described, the data driven engine 338 estimates a $v_0$ and a k that are not dependent of the boundary conditions. This is very desirable, but the estimated function also needs to go through a time-depth point at the top horizon. The optimize-estimation-of-K engine 340 maintains the desirable features provided by the above-described data driven engine 338, while enabling the function to go through a known time-depth point 314 that occurs on the top horizon.

In such an implementation, when the boundary influence reducer 330 is used in conjunction with the coefficients estimator 326, the minimum-error-in-depth-engine 332 minimizes the error in depth and still follows the trend in velocity. To begin describing this implementation, a depth residual is given by Equation (40):

$$r = z - \hat{z} \quad (35)$$

where z is the observed depth value and $\hat{z}$ is the fitted depth value.

When there is well marker data 316 and input data points 314, then by combining Equation (35) and Equation (2) into Equation (16), the summed squares of residuals is given by Equation (36):

$$S = \sum_{j=1}^{m} \omega_j \left( v_0 \alpha_j + \frac{1}{2} k \alpha_j \gamma_j - \beta_j \right)^2 \quad (36)$$

$$\beta_j = z_j - z_c, \; \alpha_j = t_j - t_c, \; \gamma_j = t_j + t_c$$

where $t_j$ and $z_j$ are the input time-and-depth data 314. Minimizing Equation (36) provides the combination of $v_0$ and k that minimizes error in depth. The optimize-estimation-of-K engine 340 finds $v_0$ by using Equation (2) with the known time at the base of the interval $t = t_B$ and the depth given by the well marker $z = z_M$ yielding the expression for $v_0$ given in Equation (37):

$$v_0 = \frac{\beta_M}{\alpha_B} - \frac{1}{2} k \gamma_B \quad (37)$$

$$\beta_M = z_M - z_c, \; \alpha_B = t_B - t_c, \; \gamma_B = t_B + t_c$$

When there are only input data points 314 and no well marker data 316, then the optimize-estimation-of-K engine 340:
1. Estimates k using the data driven method with $t_c = t_T$.
2. Calculates $v_0$ by using Equation (41), below.

By combining Equation (35) and Equation (2) into Equation (16), the summed squares of residuals is given by Equation (38):

$$S = \sum_{j=1}^{m} \omega_j \left( v_0 \alpha_j + \frac{1}{2} k \alpha_j \gamma_j - \beta_j \right)^2 \quad (38)$$

$$\beta_j = z_j - z_c, \; \alpha_j = t_j - t_c, \; \gamma_j = t_j + t_c$$

where $t_j$ and $z_j$ are the input time-and-depth data 314. Minimizing Equation (38) obtains a combination of $v_0$ and k that minimizes the error in depth. As above, the partial derivative of S with respect to $v_0$ is set equal to zero, as in Equation (39):

$$\frac{\partial S}{\partial v_0} = 0 \quad (39)$$

-continued $$\frac{\partial S}{\partial v_0} = 2 \sum_{j=1}^{m} \omega_j \left( v_0 \alpha_j^2 + \frac{1}{2} k \alpha_j^2 \gamma_j - \beta_j \alpha_j \right) \quad (40)$$

An expression for $v_0$ is obtained by inserting Equation (40) into Equation (39):

$$v_0 = \frac{\sum_{j=1}^{m} (\omega_j \beta_j \alpha_j) - \frac{1}{2} k \sum_{j=1}^{m} (\omega_j \alpha_j^2 \gamma_j)}{\sum_{j=1}^{m} (\omega_j \alpha_j^2)} \quad (41)$$

When there are input data points 314 and well marker data 316, the optimize-estimation-of-K engine 340:
1. Estimates k using the data driven method with $t_c = t_T$.
2. Calculates $v_0$ by using Equation (37) with $t_c = t_T$ and $z_c = z_T$.

Figure 11:
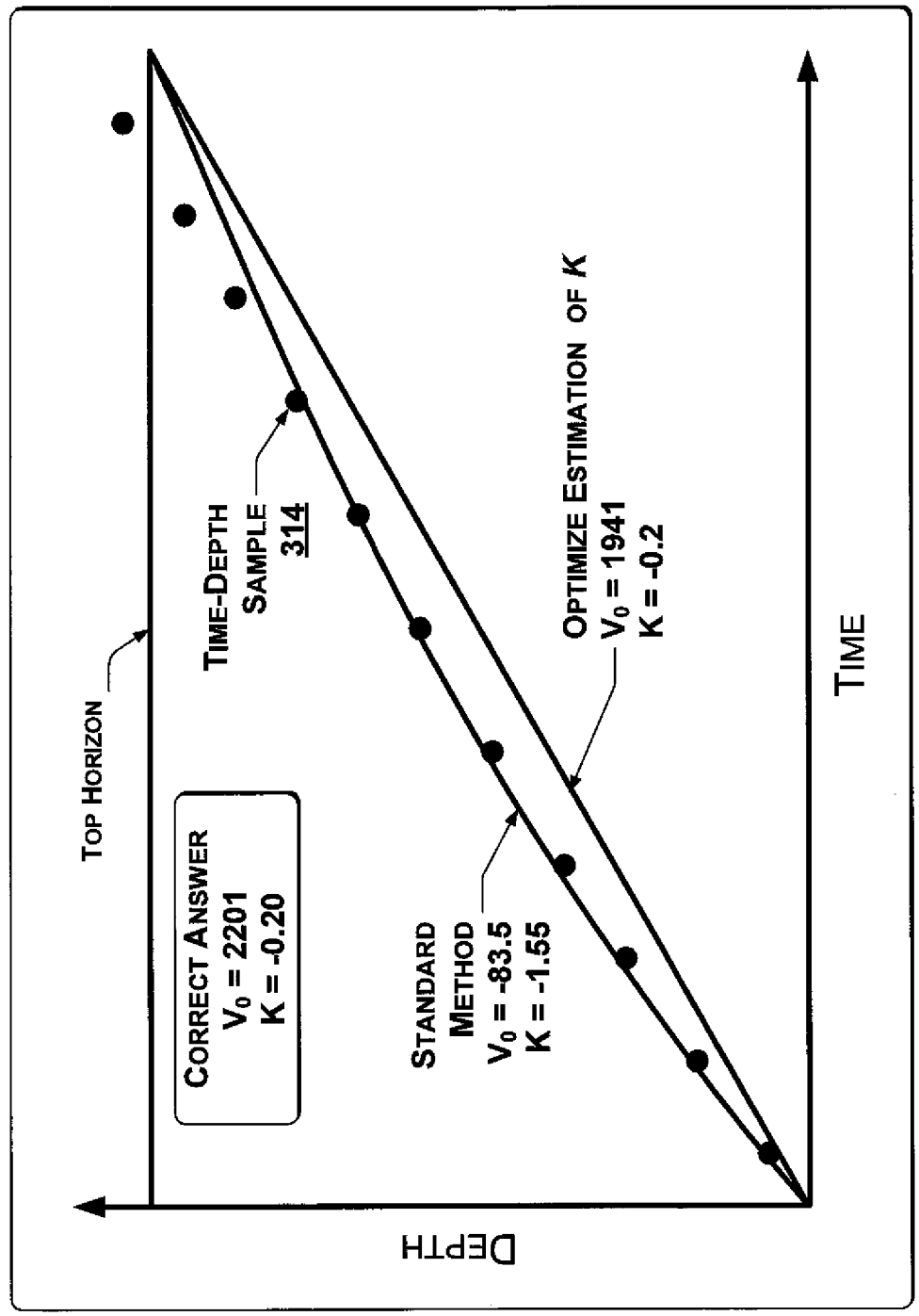
FIG. 11 is a diagram of an example velocity model created using an example optimize-for-estimation-of-K technique.

FIG. 11 shows a comparison between the standard method versus methods applied by the optimize-for-estimation-of-k engine 340. The estimation of k provides $v_0$ and k values that give the minimum error in depth and still follow the trend in velocity. There is also a reduced domino effect of error propagation between layers. FIG. 8 also shows that the optimize-for-estimation-of-k engine 340 gives $v_0$ and k values that are much closer to an ideal solution than the standard method. It is worth noting that it is not possible to find the ideal solution because the technique itself has moved the top horizon down a small increment. But the optimize-for-estimation-of-k engine 340 does provide solutions very close to the ideal solution.

Estimating and Adjusting to Base

The estimate-and-adjust-to-base engine 342:
1. Estimates $v_0$ and k within the processes of the data driven engine 338, with $t_c = t_T$.
2. Calculates $z_B$ by using Equation (34) with $t_c = t_T$.
3. Uses the standard method or works in conjunction with the optimize-for-estimation-of-k engine 340, with $z_M = z_B$.

Figure 12:
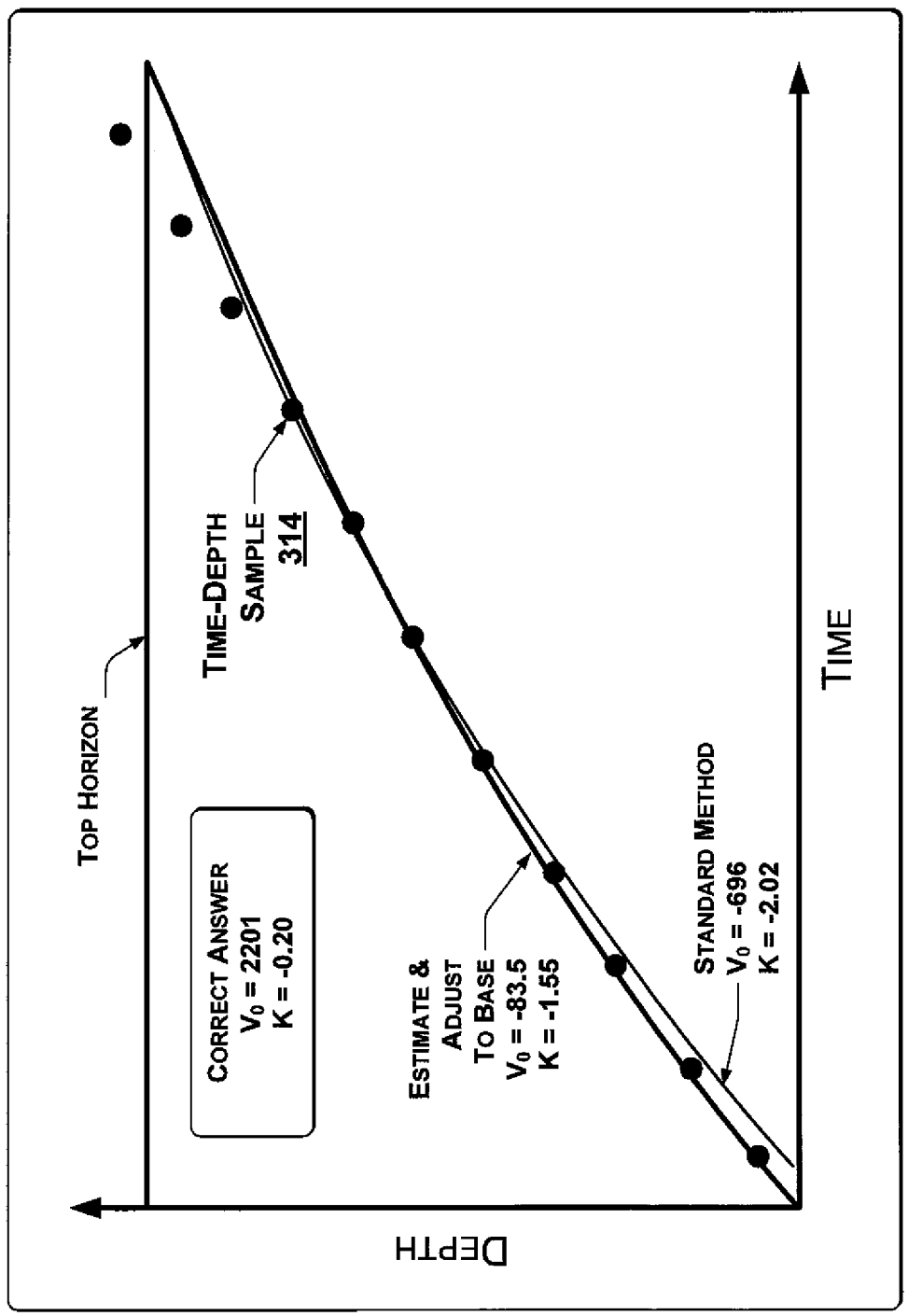
FIG. 12 is a diagram of an example velocity model created using an example estimate-and-adjust-to-base technique.

The standard method often gives an unsatisfactory data fit at the base of the zone or layer when there is no well marker data 316. The estimate-and-adjust-to-base engine 342 uses the trend in the input data points 314 to estimate where the base of the zone should be, measured in depth. The estimate-and-adjust-to-base engine 342 also ensures that the function goes through that point. As shown in FIG. 12, the estimate-and-adjust-to-base engine 342 provides a more reliable base in depth.

Harmonized TDR Optimization Engine

Figure 13:
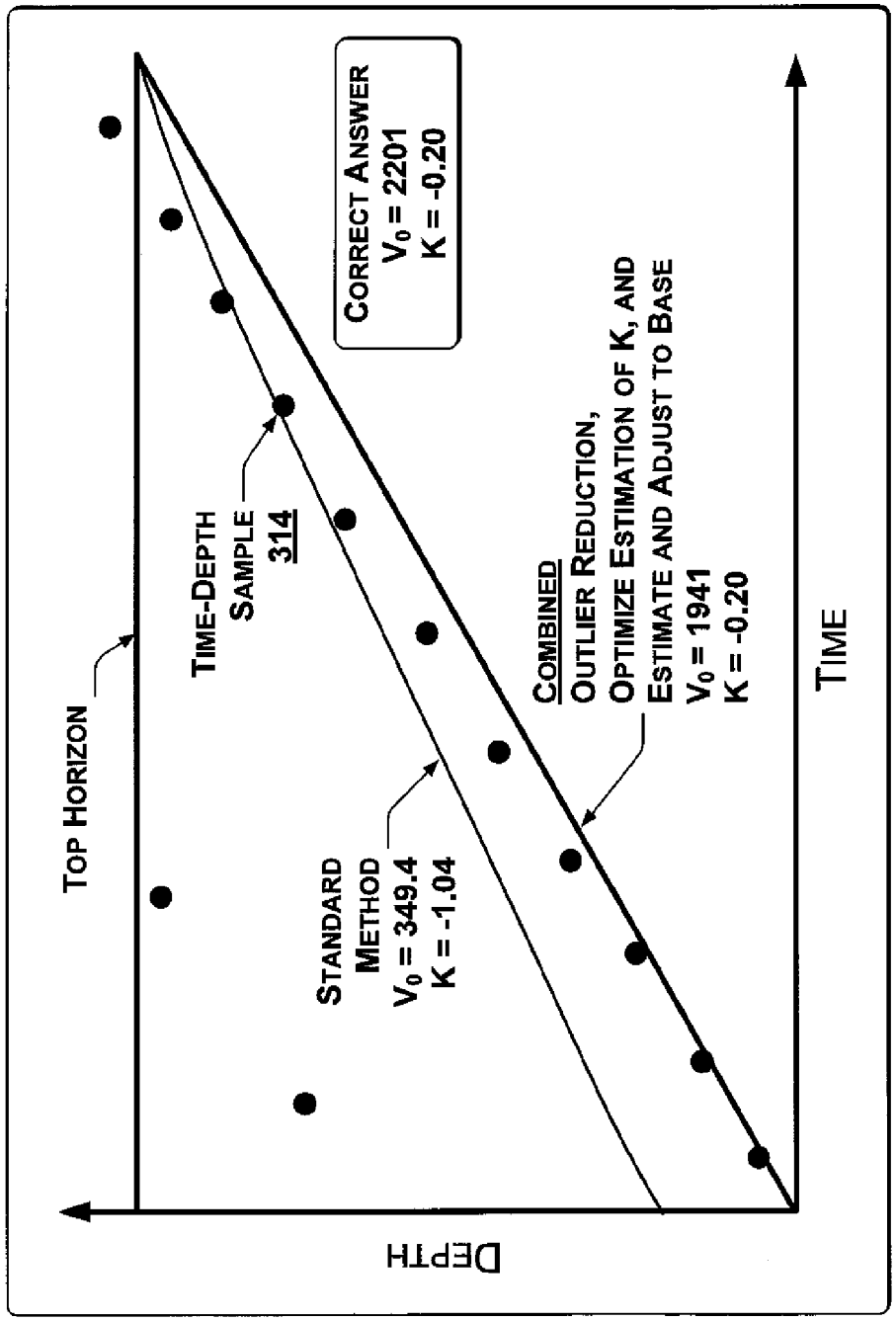
FIG. 13 is a diagram of an example velocity model created by simultaneously using an example data weights technique to reduce the influence of outlier data values, an example optimize for estimation of K technique to reduce the influence of boundary conditions, and an example estimate and adjust to base technique to reduce the influence of boundary conditions.

In one implementation, the TDR optimization engine 324 uses multiple components simultaneously to improve accuracy and robustness both in depth conversion and in creation of the velocity model 304. A harmonized TDR optimization engine 324 may use the data weights engine 336 for reducing the effects of outlier values; and at the same time use the optimize-estimation-of-k engine 340 and estimate-and-adjust-to-base engine 342 for reducing boundary influences. This implementation with at least the three innovative components actively improving the manner in which collected data 306 is used provides an improved result (i.e., improved depth conversion, improved velocity model 304 and structural model 110). This is especially true, for example, when there are input data points 314 that include outlier values, and a top horizon that does not match the input data 314 (e.g., a scenario shown in FIG. 8). FIG. 13 shows an improved result over the standard method, especially when there are rough input data with outlier values, and a top horizon that does not match the input data 314.

Example Methods

Figure 14:
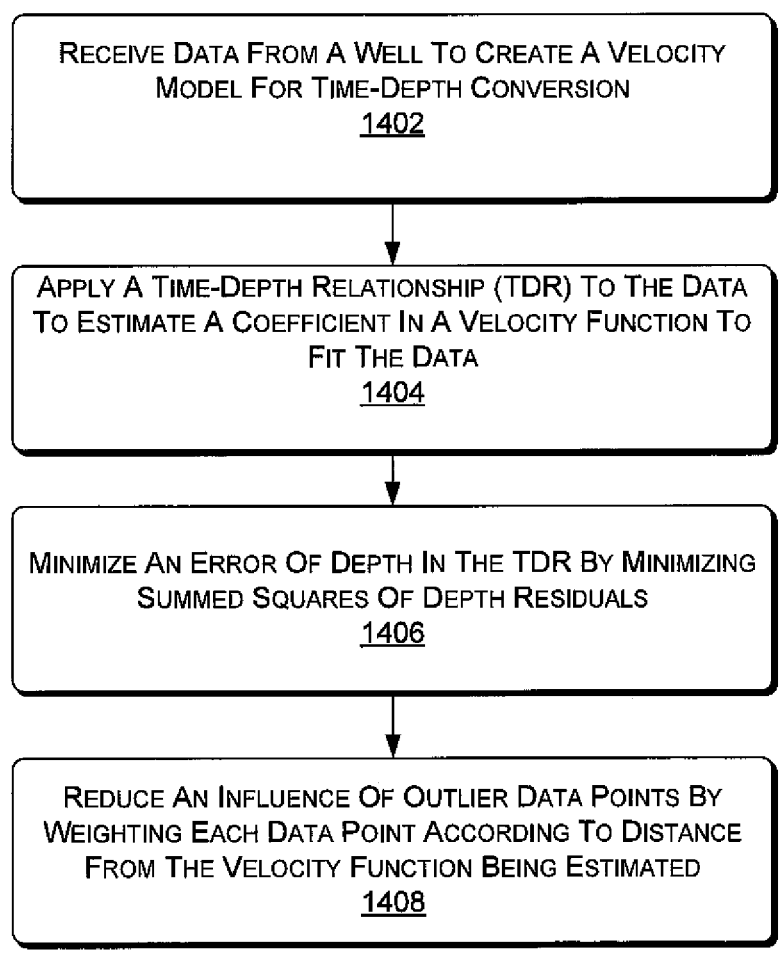
FIG. 14 is a flow diagram of an example method of reducing outlier values to improve creation of a velocity model for time-depth conversion in seismology.

FIG. 14 shows an example method of reducing outlier values to improve creation of a velocity model for time-depth conversion in seismology. In the flow diagram, the operations are summarized in individual blocks. The example method 1400 may be performed by hardware or combinations of hardware and software, for example, by the example velocity modeler 202.

At block 1402, data from a well is received to create a velocity model for time-depth conversion.

At block 1404, a time-depth relationship (TDR) is applied to the data to estimate a coefficient for a velocity function to fit the data.

At block 1406, an error of depth is minimized in applying the time-depth relationship by minimizing summed squares of depth residuals.

At block 1408, the influence of outlier data points is reduced by weighting each data point according to a distance of the data point from the velocity function being estimated.

Figure 15:
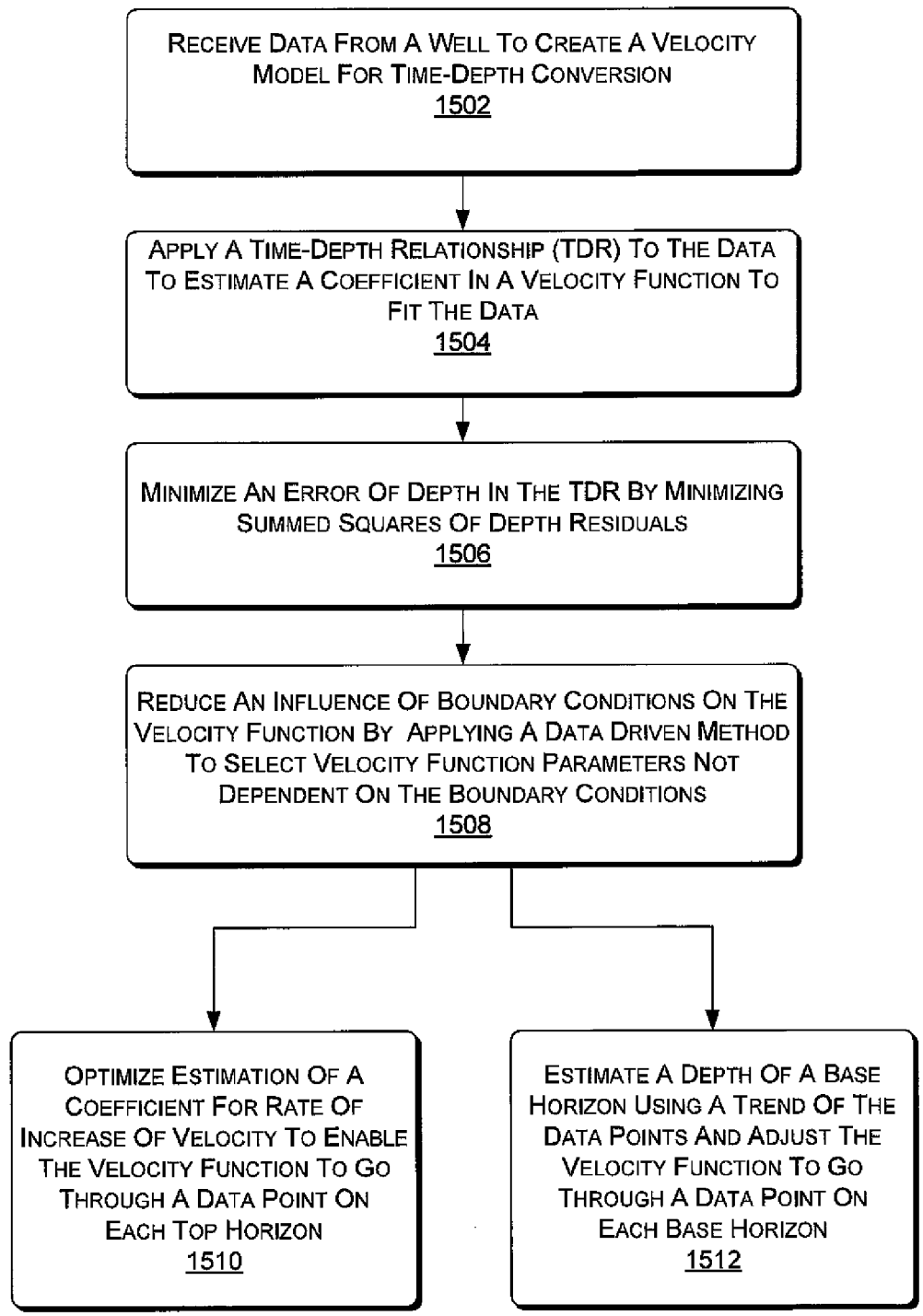
FIG. 15 is a flow diagram of an example method of reducing the influence of boundary conditions on the modeling of a velocity function for well time-depth conversion.

FIG. 15 shows an example method of reducing the influence of boundary conditions on a velocity function for well time-depth conversion. In the flow diagram, the operations are summarized in individual blocks. The example method 1500 may be performed by hardware or combinations of hardware and software, for example, by the example velocity modeler 202.

At block 1502, data from a well is received for creating a velocity model for time-depth conversion.

At block 1504, a time-depth relationship is applied to the data to estimate a coefficient in a velocity function to be fit to the data.

At block 1506, an error of depth in applying the time-depth relationship is minimized by minimizing in turn the summed squares of depth residuals.

At block 1508, an influence of boundary conditions on the velocity function is reduced by applying a data driven method to select velocity function parameters that are not dependent on the boundary conditions.

One or both of blocks 1510 and 1512 may be utilized.

At block 1510, estimation of a coefficient for rate of increase of velocity is optimized to enable the velocity function to go through a data point on each top horizon.

At block 1512, a depth of a base horizon is estimated from trends in the data, and the velocity function is adjusted to go through a data point on each base horizon.

Time-Depth Relationship (TDR) Estimation for a Set of Wells

In the next division of this disclosure, velocity models based on data from a set of wells, instead of just a single well, are described. The objective is to create a velocity model that makes maximum use of well data, yet is still mathematically robust and tolerant of realistic levels of noise in the data. To accomplish this, the influence of well outliers is reduced through example methods and components described below.

The various examples to be described below present new methods for estimating the unknown coefficients in a set of analytic velocity functions and new methods that minimize the influence of outliers wells when the time-depth relationship (TDR) is applied to data from a set of wells.

Specifically, a description of new well weights method is included. The new methods can be implemented, for example, by the exemplary velocity modeler 202 of FIG. 2. New methods of reducing the effect of well outliers on the estimation of the coefficients of analytic velocity functions, using the new well weights method, can be implemented across several types of analytic velocity functions. For example, the new methods can be implemented using an interval velocity function and a linear-velocity-in-depth function. Coefficient estimation for these analytic velocity functions can be accomplished by either the minimum depth method or the minimum velocity method. To implement the new methods, the example outlier value reducer 328 of FIG. 3 can include a data weights engine 336 that handles well weights, i.e., weighted data from across multiple wells, instead of just data points obtained from a single well.

Since the new well-weighted outlier reduction techniques can utilize either an interval velocity function or a linear-velocity-in-depth function (or even a linear-velocity-in-time function), and further utilize either the minimum depth method or the minimum velocity method, various examples of combinations of these techniques will now be listed and described, including mathematical derivation of working equations to implement each example as a method (a practical process) or as a system component.

Coefficient Estimation for the Interval Velocity Function
Examples to be described include:
The minimum depth method ($v_0$: Correction–Constant)
The minimum depth method ($v_0$: Well TDR–Constant)
The minimum velocity method ($v_0$: Correction–Constant)
The minimum velocity method ($v_0$: Well TDR–Constant)
Coefficient Estimation for the Linear Velocity in Depth Function
Examples to be described include:
Min depth method ($v_0$: Correction–Constant, k: Well TDR–Constant)
Min depth method ($v_0$: Well TDR–Constant, k: Well TDR–Constant)
Min depth method ($v_0$: Correction–Constant, k: Well TDR–Surface)
Min depth method ($v_0$: Well TDR–Constant, k: Well TDR–Surface)
Min depth method ($v_0$: Correction–Surface, k: Well TDR–Constant)
Min depth method ($v_0$: Well TDR–Surface, k: Well TDR–Constant)
Min depth method ($v_0$: Given by user, k: Well TDR–Constant)
Min depth method ($v_0$: Correction–Constant, k: Given by user)
Min depth method ($v_0$: Well TDR–Constant, k: Given by user)
Min velocity method ($v_0$: Correction–Constant, k: Well TDR–Constant)
Min velocity method ($v_0$: Well TDR–Constant, k: Well TDR–Constant)
Min velocity method ($v_0$: Correction–Constant, k: Well TDR–Surface)
Min velocity method ($v_0$: Well TDR–Constant, k: Well TDR–Surface)
Min velocity method ($v_0$: Correction–Surface, k: Well TDR–Constant)
Min velocity method ($v_0$: Well TDR–Surface, k: Well TDR–Constant)
Min velocity method ($v_0$: Given by user, k: Well TDR–Constant)
Min velocity method ($v_0$: Correction–Constant, k: Given by user)

Min velocity method ($v_0$: Well TDR–Constant, k: Given by user)

Background, for Derivations

To estimate the best combination coefficients in a set of functions, minimizing the summed squares of residuals can still be used. The summed square of residuals is given by Equation (42):

$$S = \sum_{i=1}^{n} r_i^2 \qquad (42)$$

where r is the residual for one well and n is the number of wells. A measure of the quality of the fit is desirable and can be obtained from standard deviation, in Equation (43):

$$E = \sqrt{\frac{S}{n}} \qquad (43)$$

Disadvantages

The standard methods have the disadvantage that they are sensible to well outliers. Well outliers have a large influence on the fit because squaring the residuals magnifies the effect of these extreme data points from the multiple wells.

The Well Weights Method

To minimize the influence of outliers a robust weighted least square method is used, as in Equation (44):

$$S = \sum_{i=1}^{n} \mu_i r_i^2 \qquad (44)$$

where n is the number of wells, and the $\mu_j$ are weights. The weights determine how much each well influences the final parameter estimates. A bi-square weights method is employed that minimizes a weighted sum of squares, where the weight given to each well depends on how far the well data is from the fitted function. Wells with data near the analytic function receive full weight. Points farther from the analytic function are assigned reduced weight. Wells with data that are father from analytic function than would be expected by random chance receive zero weight. The robust fitting with bi-square weights uses an iteratively re-weighted least squares algorithm, and follows the procedure described in Appendix B.

Figure 16:
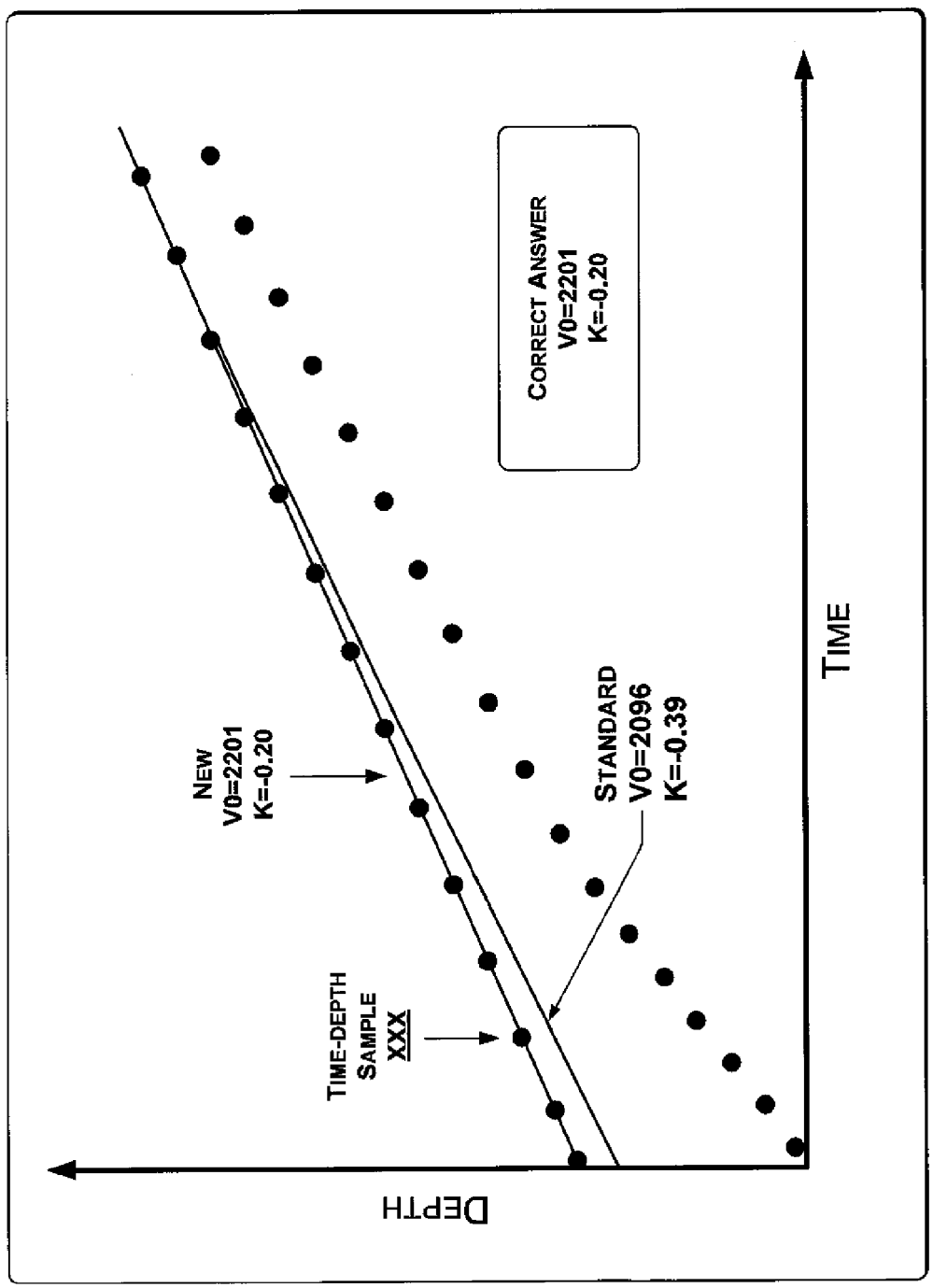
FIG. 16 is a diagram showing well weights reducing the influence of well outliers.

The function in Equation (44) can be rewritten, as in Equation (45), to:

$$S = \sum_{i=1}^{n} \mu_i r_i^2 = \sum_{i=1}^{n} \mu_i E_i^2 = \sum_{i=1}^{n} \frac{\mu_i}{m_i} S_i \qquad (45)$$

where $S_i$ is the summed squares of residuals for one well, and $m_i$ is the number of data points in that well. FIG. 16 shows well weights reducing the influence of well outliers.

Interval Velocity Function

The simplest classical analytic instantaneous velocity function is the interval velocity, as in Equation (46):

$$v = v_0 \qquad (46)$$

where $v_0$ is the instantaneous velocity at the datum. As described in Appendix C, it can be shown that the depth z can be expressed as a function of time t, as shown in Equation (47):

$$z = z_c + v_0 (t - t_c) \qquad (47)$$

where $t_c$ and $z_c$ are the time and depth boundary values. It is common to set the boundary values equal to the time and depth at the top of the layer, i.e., ($t_c = t_T$ and $z_c = z_T$).

1. Example Minimum Depth Method ($v_0$: Correction–Constant)

This method minimizes the error in depth. The depth residual is then given by Equation (48):

$$r = z + \hat{z} \qquad (48)$$

where z is the observed depth value and $\hat{z}$ is the fitted depth value. By inserting functions (47) and (48) into function (45) it can be shown that the summed squares of residuals can be written as Equation (49):

$$S = \sum_{i=1}^{n} \mu_i (\delta_i - v_0 \varphi_i)^2, \qquad (49)$$

$$\delta_i = z_{M_i} - z_{c_i}, \quad \varphi_i = t_{B_i} - t_{c_i}$$

where the known time at the base of the interval is $t = t_B$ and the depth given by the correction object is $z = z_M$. To find the $v_0$ that gives the minimum error in depth, the minimum of function (49) is obtained. This can be achieved by setting the partial derivative of S with respect to $v_0$ equal to zero, as in Equation (50):

$$\frac{\partial S}{\partial v_0} = 0 \qquad (50)$$

$$\frac{\partial S}{\partial v_0} = 2 v_0 \sum_{i=1}^{n} \mu_i \varphi_i^2 - 2 \sum_{i=1}^{n} \mu_i \delta_i \varphi_i \qquad (51)$$

An expression for $v_0$ is obtained by inserting function (51) into function (50) to obtain Equation (52):

$$v_0 = \frac{\sum_{i=1}^{n} \mu_i \delta_i \varphi_i}{\sum_{i=1}^{n} \mu_i \varphi_i^2} \qquad (52)$$

The resulting $v_0$ provides the minimum error in depth.

2. Example Minimum Depth Method ($v_0$: Well TDR–Constant)

This method minimizes the error in depth. By inserting functions (47) and (48) into function (45) the summed squares of residuals can be written as in Equation (53):

$$S = \sum_{i=1}^{n} \frac{\mu_i}{m_i} \sum_{j=1}^{m_i} \omega_{i,j} (\beta_j - v_0 \alpha_{i,j})^2, \qquad (53)$$

$$\beta_{i,j} = z_{i,j} - z_{c_{i,j}}, \quad \alpha_{i,j} = t_{i,j} - t_{c_{i,j}}$$

where $t_{i,j}$ and $z_{i,j}$ are the input data in time and depth. To find the $v_0$ that gives the minimum error in depth, the minimum of function (53) is obtained. This can be achieved by setting the partial derivative of S with respect to $v_0$ equal to zero, as in Equation (54):

$$\frac{\partial S}{\partial v_0} = 0 \qquad (54)$$

$$\frac{\partial S}{\partial v_0} = 2v_0 \sum_{i=1}^{n} \frac{\mu_i}{m_i} \sum_{j=1}^{m_i} \omega_{i,j} \alpha_{i,j}^2 - 2 \sum_{i=1}^{n} \frac{\mu_i}{m_i} \sum_{j=1}^{m_i} \omega_{i,j} \beta_{i,j} \alpha_{i,j} \qquad (55)$$

An expression for $v_0$, can be obtained by inserting function (55) into function (54), to obtain Equation (56):

$$v_0 = \frac{\sum_{i=1}^{n} \frac{\mu_i}{m_i} \sum_{j=1}^{m_i} \omega_{i,j} \beta_{i,j} \alpha_{i,j}}{\sum_{i=1}^{n} \frac{\mu_i}{m_i} \sum_{j=1}^{m_i} \omega_{i,j} \alpha_{i,j}^2} \qquad (56)$$

The resulting $v_0$ provides the minimum error in depth.

3. Example Minimum Velocity Method ($v_0$: Correction–Constant)

This method minimizes the error in velocity. The velocity residual is then given by Equation (57):

$$r = v\hat{v} \qquad (57)$$

where v is the observed velocity value and $\hat{v}$ is the fitted velocity value. By inserting functions (47) and (57) into function (45) the summed squares of residuals can be written as in Equation (58):

$$S = \sum_{i=1}^{n} \mu_i \left(v_0 - \frac{\delta_i}{\varphi_i}\right)^2, \quad \delta_i = z_{M_i} - z_{c_i}, \quad \varphi_i = t_{B_i} - t_{c_i} \qquad (58)$$

where the known time at the base of the interval is $t = t_B$ and the depth given by the correction object is $z = z_M$. To find the $v_0$ that gives the minimum error in velocity, the minimum of function (58) is obtained. This is achieved by setting the partial derivative of S with respect to $v_0$ equal to zero, as in Equation (59):

$$\frac{\partial S}{\partial v_0} = 0 \qquad (59)$$

$$\frac{\partial S}{\partial v_0} = 2v_0 \sum_{i=1}^{n} \mu_i - 2 \sum_{i=1}^{n} \mu_i \frac{\delta_i}{\varphi_i} \qquad (60)$$

An expression for $v_0$ is obtained by inserting function (60) into function (59) to obtain Equation (61):

$$v_0 = \frac{\sum_{i=1}^{n} \mu_i \frac{\delta_i}{\varphi_i}}{\sum_{i=1}^{n} \mu_i} \qquad (61)$$

The resulting $v_0$ provides the minimum error in velocity.

4. Example Minimum Velocity Method ($v_0$: Well TDR–Constant)

This method minimizes the error in velocity. The velocity residual is then given in Equation (62):

$$r = v - \hat{v} = v_0 - \frac{\hat{z} - \hat{z}_c}{\hat{t} - \hat{t}_c} \qquad (62)$$

where v is the observed velocity value and $\hat{v}$ is the fitted velocity value. By inserting functions (47) and (62) into function (45) the summed squares of residuals can be written as in Equation (63):

$$S = \sum_{i=1}^{n} \frac{\mu_i}{m_i} \sum_{j=1}^{m_i} \omega_{i,j} \left(v_0 - \frac{\beta_{i,j}}{\alpha_{i,j}}\right)^2, \qquad (63)$$

$$\beta_{i,j} = z_{i,j} - z_{c_{i,j}}, \quad \alpha_{i,j} = t_{i,j} - t_{c_{i,j}}$$

where $t_{i,j}$ and $z_{i,j}$ are the input data in time and depth. To find the $v_0$ that gives the minimum error in velocity, the minimum of function (63) is obtained. This can be achieved by setting the partial derivative of S with respect to $v_0$ equal to zero, as in Equation (64):

$$\frac{\partial S}{\partial v_0} = 0 \qquad (64)$$

$$\frac{\partial S}{\partial v_0} = 2v_0 \sum_{i=1}^{n} \frac{\mu_i}{m_i} \sum_{j=1}^{m_i} \omega_{i,j} - 2 \sum_{i=1}^{n} \frac{\mu_i}{m_i} \sum_{j=1}^{m_i} \omega_{i,j} \frac{\beta_{i,j}}{\alpha_{i,j}} \qquad (65)$$

An expression for $v_0$ is obtained by inserting function (65) into function (64) to obtain Equation (66):

$$v_0 = \frac{\sum_{i=1}^{n} \frac{\mu_i}{m_i} \sum_{j=1}^{m_i} \omega_{i,j} \frac{\beta_{i,j}}{\alpha_{i,j}}}{\sum_{i=1}^{n} \frac{\mu_i}{m_i} \sum_{j=1}^{m_i} \omega_{i,j}} \qquad (66)$$

The resulting $v_0$ provides the minimum error in velocity.

Linear Velocity Function

The best known classical analytic instantaneous velocity function is the linear velocity (in depth) function of Equation (67):

$$v = v_0 + kz \qquad (67)$$

where $v_0$ is the instantaneous velocity at the datum and k is the rate of increase of velocity (i.e., the Compaction Factor).

Appendix D describes that the depth z can be expressed as a function of time t as in Equation (68):

$$z = \frac{v_0}{k}(e^{k(t-t_c)} - 1) + z_c e^{k(t-t_c)} \quad (68)$$

where $t_c$ and $z_c$ are the time and depth boundary values. It is common to set the boundary values equal to the time and depth at the top of the layer ($t_c = t_T$ and $z_c = z_T$).

5. Example Minimum Depth Method ($v_0$: Correction–Constant, k: Well TDR–Constant)

In this method $v_0$, is found by using function (68) with the known time at the base of the interval $t = t_B$ and the depth given by the correction object $z = z_M$. This provides the following expression for $v_0$ in Equation (69):

$$v_0 = k\frac{z_M - z_c \varphi}{\delta}, \quad \delta = \varphi - 1, \quad \varphi = e^{k(t_B - t_c)} \quad (69)$$

This method minimizes the error in depth. By inserting functions (68) and (69) into function (45) the summed squares of residuals can be written as in Equation (70):

$$S_{v_0} = \sum_{i=1}^{n} \mu_i \left(\frac{v_0}{k}\delta_i - (z_{M_i} - z_{c_i}\varphi_i)\right)^2, \quad (70)$$

$$\delta_i = \varphi_i - 1, \quad \varphi_i = e^{k(t_{B_i} - t_{c_i})}$$

where the known time at the base of the interval is $t = t_B$ and the depth given by the correction object is $z = z_M$.

$$S_k = \sum_{i=1}^{n} \frac{\mu_i}{m_i} \sum_{j=1}^{m_i} \omega_{i,j}\left(\frac{v_0}{k}\beta_{i,j} - (z_{i,j} - z_{c_i}\alpha_{i,j})\right)^2, \quad (71)$$

$$\beta_{i,j} = \alpha_{i,j} - 1, \quad \alpha_{i,j} = e^{k(t_{i,j} - t_{c_i})}$$

where $t_{i,j}$ and $z_{i,j}$ are the input data in time and depth. To find the combination of $v_0$ and k that gives the minimum error in depth, the minimum of functions (70) and (71) is obtained. This is accomplished by setting the partial derivative of $S_{v_0}$ with respect to $v_0$ equal to zero and the partial derivative of $S_k$ with respect to k equal to zero.

$$\frac{\partial S_{v_0}}{\partial v_0} = \frac{\partial S_k}{\partial k} = 0 \quad (72)$$

$$\frac{\partial S_{v_0}}{\partial v_0} = \frac{2v_0}{k^2}\sum_{i=1}^{n}\mu_i \varphi_i^2 - \frac{2}{k}\sum_{i=1}^{n}\mu_i(z_{M_i} - z_{c_i}\varphi_i)\delta_i \quad (73)$$

$$\frac{\partial S_k}{\partial k} = 2\sum_{i=1}^{n}\frac{\mu_i}{m_i}\sum_{j=1}^{m_i}\omega_{i,j}\left(\frac{v_0}{k}\beta_{i,j} - (z_{i,j} - z_{c_i}\alpha_{i,j})\right) \quad (74)$$

$$\left(\frac{v_0}{k^2}(\alpha_{i,j}(k(t_{i,j} - t_{c_i}) - 1) + 1) + z_{c_i}(t_{i,j} - t_{c_i})\alpha_{i,j}\right)$$

An expression for $v_0$ may be obtained by inserting function (73) into function (72), as in Equation (75):

$$v_0 = k\frac{\sum_{i=1}^{n}\mu_i(z_{M_i} - z_{c_i}\varphi_i)\delta_i}{\sum_{i=1}^{n}\mu_i \varphi_i^2} \quad (75)$$

By using functions (72), (74) and (75) a relation that just is dependent on k is obtained, in Equation (76):

$$\begin{cases} \sum_{i=1}^{n}\frac{\mu_i}{m_i}\sum_{j=1}^{m_i}\omega_{i,j}\left(\frac{v_0}{k}\beta_{i,j} - (z_{i,j} - z_{c_i}\alpha_{i,j})\right) \\ \left(\frac{v_0}{k^2}(\alpha_{i,j}(k(t_{i,j} - t_{c_i}) - 1) + 1) + z_{c_i}(t_{i,j} - t_{c_i})\alpha_{i,j}\right) = 0 \\ v_0 = k\frac{\sum_{i=1}^{n}\mu_i(z_{M_i} - z_{c_i}\varphi_i)\delta_i}{\sum_{i=1}^{n}\mu_i \varphi_i^2} \end{cases} \quad (76)$$

The transcendental nature of this relation prevents the isolation of k. But a numerical method can be used to find the root of this relation.

6. Example Minimum Depth Method ($v_0$: Well TDR–Constant, k: Well TDR–Constant)

This method minimizes the error in depth. By inserting functions (68) and (48) into function (45) the summed squares of residuals can be written as in Equation (77):

$$S = \sum_{i=1}^{n}\frac{\mu_i}{m_i}\sum_{j=1}^{m_i}\omega_{i,j}\left(\frac{v_0}{k}\beta_{i,j} - (z_{i,j} - z_{c_i}\alpha_{i,j})\right)^2, \quad (77)$$

$$\beta_{i,j} = \alpha_{i,j} - 1, \quad \alpha_{i,j} = e^{k(t_{i,j} - t_{c_i})}$$

where $t_{i,j}$ and $z_{i,j}$ are the input data in time and depth. To find the combination of $v_0$ and k that gives the minimum error in depth, the minimum of function (77) is obtained. This can be achieved by setting the partial derivative of S with respect to $v_0$ and k equal to zero, as in Equation (78):

$$\frac{\partial S}{\partial v_0} = \frac{\partial S}{\partial k} = 0 \quad (78)$$

$$\frac{\partial S}{\partial v_0} = \frac{2}{k}\left(\frac{v_0}{k}\sum_{i=1}^{n}\frac{\mu_i}{m_i}\sum_{j=1}^{m_i}\omega_{i,j}\beta_{i,j}^2 - \sum_{i=1}^{n}\frac{\mu_i}{m_i}\sum_{j=1}^{m_i}\omega_{i,j}(z_{i,j} - z_{c_i}\alpha_{i,j})\beta_{i,j}\right) \quad (79)$$

$$\frac{\partial S}{\partial k} = 2\sum_{i=1}^{n}\frac{\mu_i}{m_i}\sum_{j=1}^{m_i}\omega_{i,j}\left(\frac{v_0}{k}\beta_{i,j} - (z_{i,j} - z_{c_i}\alpha_{i,j})\right) \quad (80)$$

$$\left(\frac{v_0}{k^2}(\alpha_{i,j}(k(t_{i,j} - t_{c_i}) - 1) + 1) + z_{c_i}(t_{i,j} - t_{c_i})\alpha_{i,j}\right)$$

An expression for $v_0$, may be obtained by inserting function (79) into function (78), to obtain Equation (81):

$$v_0 = k \frac{\sum_{i=1}^{n} \frac{\mu_i}{m_i} \sum_{j=1}^{m_i} \omega_{i,j}(z_{i,j} - z_{c_i}\alpha_{i,j})\beta_{i,j}}{\sum_{i=1}^{n} \frac{\mu_i}{m_i} \sum_{j=1}^{m_i} \omega_{i,j}\beta_{i,j}^2}$$ (81)

By using functions (78), (80) and (81) a relation that just is dependent on k is obtained, in Equation (82):

$$\begin{cases} \sum_{i=1}^{n} \frac{\mu_i}{m_i} \sum_{j=1}^{m_i} \omega_{i,j}\left(\frac{v_0}{k}\beta_{i,j} - (z_{i,j} - z_{c_i}\alpha_{i,j})\right) \\ \left(\frac{v_0}{k^2}(\alpha_{i,j}(k(t_{i,j}-t_{c_i})-1)+1) + z_{c_i}(t_{i,j}-t_{c_i})\alpha_{i,j}\right) = 0 \\ v_0 = k\frac{\sum_{i=1}^{n}\frac{\mu_i}{m_i}\sum_{j=1}^{m_i}\omega_{i,j}(z_{i,j}-z_{c_i}\alpha_{i,j})\beta_{i,j}}{\sum_{i=1}^{n}\frac{\mu_i}{m_i}\sum_{j=1}^{m_i}\omega_{i,j}\beta_{i,j}^2} \end{cases}$$ (82)

The transcendental nature of this relation prevents the isolation of k. A numerical method may be used to find the root of this relation.

7. Example Minimum Depth Method ($v_0$: Correction–Constant, k: Well TDR–Surface)

This method minimizes the error in depth. By inserting functions (68) and (69) into function (45) the summed squares of residuals can be written as in Equation (83):

$$S_{v_0} = \sum_{i=1}^{n} \mu_i\left(\frac{v_0}{k_i}\delta_i - (z_{M_i} - z_{c_i}\varphi_i)\right)^2,$$ (83)

$$\delta_i = \varphi_i - 1, \quad \varphi_i = e^{k_i(t_{B_i} - t_{c_i})}$$

where the known time at the base of the interval is $t=t_B$ and the depth given by the correction object is $z=z_M$.

$$S_k = \sum_{i=1}^{n} \frac{\mu_i}{m_i} \sum_{j=1}^{m_i} \omega_{i,j}\left(\frac{v_0}{k_i}\beta_{i,j} - (z_{i,j} - z_{c_i}\alpha_{i,j})\right)^2,$$ (84)

$$\beta_{i,j} = \alpha_{i,j} - 1, \quad \alpha_{i,j} = e^{k_i(t_{i,j}-t_{c_i})}$$

where $t_{i,j}$ and $z_{i,j}$ are the input data in time and depth. To find the combination of $v_0$ and $k_1, k_2, \ldots, k_n$ that gives the minimum error in depth, the minimum of function (83) and (84) is obtained. This is achieved by setting the partial derivative of $S_{v_0}$ with respect to $v_0$ equal to zero and by setting the partial derivative of $S_k$ with respect to $k_1, k_2, \ldots, k_n$ equal to zero, as in Equation (85):

$$\frac{\partial S}{\partial v_0} = \frac{\partial S}{\partial k_1} = \frac{\partial S}{\partial k_2} = \ldots = \frac{\partial S}{\partial k_n} = 0$$ (85)

-continued $$\frac{\partial S_{v_0}}{\partial v_0} = \frac{2v_0}{k^2}\sum_{i=1}^{n}\mu_i\varphi_i^2 - \frac{2}{k}\sum_{i=1}^{n}\mu_i(z_{M_i} - z_{c_i}\varphi_i)\delta_i$$ (86)

$$\frac{\partial S_k}{\partial k_i} = 2\frac{\mu_i}{m_i}\sum_{j=1}^{m_i}\omega_{i,j}\left(\frac{v_0}{k_i}\beta_{i,j} - (z_{i,j} - z_{c_i}\alpha_{i,j})\right)$$ (87)

$$\left(\frac{v_0}{k_i^2}(\alpha_{i,j}(k_i(t_{i,j}-t_{c_i})-1)+1) + z_{c_i}(t_{i,j}-t_{c_i})\alpha_{i,j}\right)$$

An expression for $v_0$, is obtained by inserting function (86) into function (85), to obtain Equation (88):

$$v_0 = \frac{\sum_{i=1}^{n}\frac{\mu_i}{k_i}(z_{M_i} - z_{c_i}\varphi_i)\delta_i}{\sum_{i=1}^{n}\frac{\mu_i}{k_i^2}\varphi_i^2}$$ (88)

By using functions (85), (87) and (88) a relation that just is dependent on $k_1, k_2, \ldots, k_n$ is obtained, in Equation (89):

$$\begin{cases} \frac{\mu_i}{m_i}\sum_{j=1}^{m_i}\omega_{i,j}\left(\frac{v_0}{k_i}\beta_{i,j} - (z_{i,j} - z_{c_i}\alpha_{i,j})\right) \\ \left(\frac{v_0}{k_i^2}(\alpha_{i,j}(k_i(t_{i,j}-t_{c_i})-1)+1) + z_{c_i}(t_{i,j}-t_{c_i})\alpha_{i,j}\right) = 0 \\ v_0 = \frac{\sum_{i=1}^{n}\frac{\mu_i}{m_i}(z_{M_i} - z_{c_i}\varphi_i)\delta_i}{\sum_{i=1}^{n}\frac{\mu_i}{k_i^2}\varphi_i^2} \end{cases}$$ (89)

The transcendental nature of this relation prevents the isolation of $k_1, k_2, \ldots, k_n$. A numerical method may be applied to find the roots of this relation.

8. Example Minimum Depth Method ($v_0$: Well TDR–Constant, k: Well TDR–Surface)

This method minimizes the error in depth. By inserting functions (68) and (48) into function (45) the summed squares of residuals can be written as in Equation (90):

$$S = \sum_{i=1}^{n} \frac{\mu_i}{m_i} \sum_{j=1}^{m_i} \omega_{i,j}\left(\frac{v_0}{k_i}\beta_{i,j} - (z_{i,j} - z_{c_i}\alpha_{i,j})\right)^2,$$ (90)

$$\beta_{i,j} = \alpha_{i,j} - 1, \quad \alpha_{i,j} = e^{k_i(t_{i,j}-t_{c_i})}$$

where $t_{i,j}$ and $z_{i,j}$ are the input data in time and depth. To find the combination of $v_0$ and $k_1, k_2, \ldots, k_n$ that gives the minimum error in depth, the minimum of function (90) is obtained. This may be achieved by setting the partial derivative of S with respect to $v_0$ and $k_1, k_2, \ldots, k_n$ equal to zero, as in Equation (91):

$$\frac{\partial S}{\partial v_0} = \frac{\partial S}{\partial k_1} = \frac{\partial S}{\partial k_2} = \ldots = \frac{\partial S}{\partial k_n} = 0$$ (91)

-continued $$\frac{\partial S}{\partial v_0} = \tag{92}$$

$$2\left(v_0 \sum_{i=1}^{n} \frac{\mu_i}{k_i^2 m_i} \sum_{j=1}^{m_i} \omega_{i,j} \beta_{i,j}^2 - \sum_{i=1}^{n} \frac{\mu_i}{k_i m_i} \sum_{j=1}^{m_i} \omega_{i,j}(z_{i,j} - z_{c_i} \alpha_{i,j}) \beta_{i,j}\right)$$

$$\frac{\partial S}{\partial k_i} = 2 \frac{\mu_i}{m_i} \sum_{j=1}^{m_i} \omega_{i,j} \left(\frac{v_0}{k_i} \beta_{i,j} - (z_{i,j} - z_{c_i} \alpha_{i,j})\right) \tag{93}$$

$$\left(\frac{v_0}{k_i^2}(\alpha_{i,j}(k_i(t_{i,j} - t_{c_i}) - 1) + 1) + z_{c_i}(t_{i,j} - t_{c_i})\alpha_{i,j}\right)$$

An expression for $v_0$ is obtained by inserting function (92) into function (91), to obtain Equation (94):

$$v_0 = \frac{\sum_{i=1}^{n} \frac{\mu_i}{k_i m_i} \sum_{j=1}^{m_i} \omega_{i,j}(z_{i,j} - z_{c_i} \alpha_{i,j}) \beta_{i,j}}{\sum_{i=1}^{n} \frac{\mu_i}{k_i^2 m_i} \sum_{j=1}^{m_i} \omega_{i,j} \beta_{i,j}^2} \tag{94}$$

By using functions (91), (93) and (94) a relation that just is dependent on $k_1, k_2, \ldots, k_n$ is obtained, as in Equation (95):

$$\begin{cases} \sum_{j=1}^{m_i} \omega_{i,j}\left(\frac{v_0}{k_i}\beta_{i,j} - (z_{i,j} - z_{c_i}\alpha_{i,j})\right) \\ \left(\frac{v_0}{k_i^2}(\alpha_{i,j}(k_i(t_{i,j}-t_{c_i})-1)+1) + z_{c_i}(t_{i,j}-t_{c_i})\alpha_{i,j}\right) = 0 \\ v_0 = \dfrac{\sum_{i=1}^{n} \frac{\mu_i}{k_i m_i} \sum_{j=1}^{m_i} \omega_{i,j}(z_{i,j} - z_{c_i}\alpha_{i,j})\beta_{i,j}}{\sum_{i=1}^{n} \frac{\mu_i}{k_i^2 m_i} \sum_{j=1}^{m_i} \omega_{i,j}\beta_{i,j}^2} \end{cases} \tag{95}$$

The transcendental nature of this relation prevents the isolation of $k_1, k_2, \ldots, k_n$. A numerical method may be used to find the roots of this relation.

9. The Minimum Depth Method ($v_0$: Correction–Surface, k: Well TDR–Constant)

This method minimizes the error in depth. By inserting functions (68) and (48) into function (45) the summed squares of residuals can be written as in Equation (96):

$$S = \sum_{i=1}^{n} \frac{\mu_i}{m_i} \sum_{j=1}^{m_i} \omega_{i,j}\left(\frac{v_{0_i}}{k}\beta_{i,j} - (z_{i,j} - z_{c_i}\alpha_{i,j})\right)^2, \tag{96}$$

$$\beta_{i,j} = \alpha_{i,j} - 1, \quad \alpha_{i,j} = e^{k(t_{i,j} - t_{c_i})}$$

where $t_{i,j}$ and $z_{i,j}$ are the input data in time and depth. To find the combination of $v_{0_1}, v_{0_2}, \ldots, v_{0_n}$ and k that gives the minimum error in depth, the minimum of function (96) is obtained. This can be achieved by setting the partial derivative of S with respect to k equal to zero, as in Equation (97):

$$\frac{\partial S}{\partial k} = 0 \tag{97}$$

$$\frac{\partial S}{\partial k} = 2 \sum_{i=1}^{n} \frac{\mu_i}{m_i} \sum_{j=1}^{m_i} \omega_{i,j}\left(\frac{v_{0_i}}{k}\beta_{i,j} - (z_{i,j} - z_{c_i}\alpha_{i,j})\right) \tag{98}$$

$$\left(\frac{v_{0_i}}{k^2}(\alpha_{i,j}(k(t_{i,j}-t_{c_i})-1)+1) + z_{c_i}(t_{i,j}-t_{c_i})\alpha_{i,j}\right)$$

In this method, $v_{0_1}, v_{0_2}, \ldots, v_{0_n}$ is found by using function (68) with the known time at the base of the interval $t=t_B$ and the depth given by the correction object $z=z_M$. This provides the following expression for $v_{0_1}, v_{0_2}, \ldots, v_{0_n}$, in Equation (99):

$$v_{0_i} = k_i \frac{z_{M_i} - z_{c_i}\varphi_i}{\delta_i}, \quad \delta_i = \varphi_i - 1, \quad \varphi_i = e^{k_i(t_{B_i} - t_{c_i})} \tag{99}$$

By using functions (97), (98) and (99) a relation that just is dependent on k is obtained, in Equation (100):

$$\begin{cases} \sum_{i=1}^{n} \frac{\mu_i}{m_i} \sum_{j=1}^{m_i} \omega_{i,j}\left(\frac{v_{0_i}}{k}\beta_{i,j} - (z_{i,j} - z_{c_i}\alpha_{i,j})\right) \\ \left(\frac{v_{0_i}}{k^2}(\alpha_{i,j}(k(t_{i,j}-t_{c_i})-1)+1) + z_{c_i}(t_{i,j}-t_{c_i})\alpha_{i,j}\right) = 0 \\ v_{0_i} = k_i \dfrac{z_{M_i} - z_{c_i}\varphi_i}{\delta_i} \end{cases} \tag{100}$$

The transcendental nature of this relation prevents the isolation of k. A numerical method can be applied to find the root of this relation.

10. Example Minimum Depth Method ($v_0$: Well TDR–Surface, k: Well TDR–Constant)

This method minimizes the error in depth. By inserting functions (68) and (48) into function (45) the summed squares of residuals can be written as in Equation (101):

$$S = \sum_{i=1}^{n} \frac{\mu_i}{m_i} \sum_{j=1}^{m_i} \omega_{i,j}\left(\frac{v_{0_i}}{k}\beta_{i,j} - (z_{i,j} - z_{c_i}\alpha_{i,j})\right)^2, \tag{101}$$

$$\beta_{i,j} = \alpha_{i,j} - 1,$$

$$\alpha_{i,j} = e^{k(t_{i,j} - t_{c_i})}$$

where $t_{i,j}$ and $z_{i,j}$ are the input data in time and depth. To find the combination of $v_{0_1}, v_{0_2}, \ldots, v_{0_n}$ and k that gives the minimum error in depth, the minimum of function (101) is obtained. This is achieved by setting the partial derivative of S with respect to $v_{0_1}, v_{0_2}, \ldots, v_{0_n}$ and k equal to zero, as in Equation (102):

$$\frac{\partial S}{\partial v_{0_1}} = \frac{\partial S}{\partial v_{0_2}} = \ldots = \frac{\partial S}{\partial v_{0_n}} = \frac{\partial S}{\partial k} = 0 \tag{102}$$

$$\frac{\partial S}{\partial v_{0_i}} = \frac{2\mu_i}{km_i}\left(\frac{v_{0_i}}{k}\sum_{j=1}^{m_i}\omega_{i,j}\beta_{i,j}^2 - \sum_{j=1}^{m_i}\omega_{i,j}(z_{i,j} - z_{c_i}\alpha_{i,j})\beta_{i,j}\right) \tag{103}$$

-continued $$\frac{\partial S}{\partial k} = 2\sum_{i=1}^{n} \frac{\mu_i}{m_i} \sum_{j=1}^{m_i} \omega_{i,j}\left(\frac{v_{0_i}}{k}\beta_{i,j} - (z_{i,j} - z_{c_i}\alpha_{i,j})\right) \quad (104)$$

$$\left(\frac{v_{0_i}}{k^2}(\alpha_{i,j}(k(t_{i,j}-t_{c_i})-1)+1) + z_{c_i}(t_{i,j}-t_{c_i})\alpha_{i,j}\right)$$

An expression for $v_{0_1}, v_{0_2}, v_{0_n}$, is obtained by inserting function (103) into function (102), as in Equation (105):

$$v_{0_i} = k\frac{\sum_{j=1}^{m_i}\omega_{i,j}(z_{i,j}-z_{c_i}\alpha_{i,j})\beta_{i,j}}{\sum_{j=1}^{m_i}\omega_{i,j}\beta_{i,j}^2} \quad (105)$$

By using functions (102), (104) and (105) a relation that just is dependent on k is obtained, as in Equation (106):

$$\begin{cases} \sum_{i=1}^{n}\frac{\mu_i}{m_i}\sum_{j=1}^{m_i}\omega_{i,j}\left(\frac{v_{0_i}}{k}\beta_{i,j}-(z_{i,j}-z_{c_i}\alpha_{i,j})\right) \\ \left(\frac{v_{0_i}}{k^2}(\alpha_{i,j}(k(t_{i,j}-t_{c_i})-1)+1)+z_{c_i}(t_{i,j}-t_{c_i})\alpha_{i,j}\right) = 0 \\ v_{0_i} = k\frac{\sum_{j=1}^{m_i}\omega_{i,j}(z_{i,j}-z_{c_i}\alpha_{i,j})\beta_{i,j}}{\sum_{j=1}^{m_i}\omega_{i,j}\beta_{i,j}^2} \end{cases} \quad (106)$$

The transcendental nature of this relation prevents the isolation of k. A numerical method may be applied to find the root of this relation.

11. Example Minimum Depth Method ($v_0$: Given by User, k: Well TDR–Constant)

This method minimizes the error in depth. By inserting functions (68) and (48) into function (45) the summed squares of residuals can be written as in Equation (107):

$$S = \sum_{i=1}^{n}\frac{\mu_i}{m_i}\sum_{j=1}^{m_i}\omega_{i,j}\left(\frac{v_{0_i}}{k}\beta_{i,j}-(z_{i,j}-z_{c_i}\alpha_{i,j})\right)^2, \quad (107)$$

$$\beta_{i,j} = \alpha_{i,j}-1,$$

$$\alpha_{i,j} = e^{k(t_{i,j}-t_{c_i})}$$

where $t_{i,j}$ and $z_{i,j}$ are the input data in time and depth. To find the k that gives the minimum error in depth, the minimum of function (107) is obtained. This is achieved by setting the partial derivative of S with respect to k equal to zero, as in Equation (108):

$$\frac{\partial S}{\partial k} = 0 \quad (108)$$

-continued $$\frac{\partial S}{\partial k} = 2\sum_{i=1}^{n}\frac{\mu_i}{m_i}\sum_{j=1}^{m_i}\omega_{i,j}\left(\frac{v_{0_i}}{k}\beta_{i,j}-(z_{i,j}-z_{c_i}\alpha_{i,j})\right) \quad (109)$$

$$\left(\frac{v_{0_i}}{k^2}(\alpha_{i,j}(k(t_{i,j}-t_{c_i})-1)+1)+z_{c_i}(t_{i,j}-t_{c_i})\alpha_{i,j}\right)$$

By using functions (108) and (109) a relation that just is dependent on k is obtained, as in Equation (110):

$$\sum_{i=1}^{n}\frac{\mu_i}{m_i}\sum_{j=1}^{m_i}\omega_{i,j}\left(\frac{v_{0_i}}{k}\beta_{i,j}-(z_{i,j}-z_{c_i}\alpha_{i,j})\right) \quad (110)$$

$$\left(\frac{v_{0_i}}{k^2}(\alpha_{i,j}(k(t_{i,j}-t_{c_i})-1)+1)+z_{c_i}(t_{i,j}-t_{c_i})\alpha_{i,j}\right) = 0$$

The transcendental nature of this relation prevents the isolation of k. A numerical method can be applied to find the root of this relation.

12. Example Minimum Depth Method ($v_0$: Correction–Constant, k: Given by User)

This method minimizes the error in depth. By inserting functions (68) and (69) into function (45) the summed squares of residuals can be written as in Equation (111):

$$S = \sum_{i=1}^{n}\mu_i\left(\frac{v_0}{k_i}\delta_i-(z_{M_i}-z_{c_i}\varphi_i)\right)^2, \quad (111)$$

$$\delta_i = \varphi_i - 1, \quad \varphi_i = e^{k_i(t_{B_i}-t_{c_i})}$$

where the known time at the base of the interval is $t=t_B$ and the depth given by the correction object is $z=z_M$. To find the $v_0$ that gives the minimum error in depth, the minimum of function (111) is obtained. This is achieved by setting the partial derivative of S with respect to $v_0$ equal to zero, as in Equation (112):

$$\frac{\partial S}{\partial v_0} = 0 \quad (112)$$

$$\frac{\partial S}{\partial v_0} = 2v_0\sum_{i=1}^{n}\frac{\mu_i}{k_i^2}\varphi_i^2 - 2\sum_{i=1}^{n}\frac{\mu_i}{k_i}(z_{M_i}-z_{c_i}\varphi_i)\delta_i \quad (113)$$

An expression for $v_0$ is obtained by inserting function (113) into function (112), as in Equation (114):

$$v_0 = \frac{\sum_{i=1}^{n}\frac{\mu_i}{k_i}(z_{M_i}-z_{c_i}\varphi_i)\delta_i}{\sum_{i=1}^{n}\frac{\mu_i}{k_i^2}\varphi_i^2} \quad (114)$$

The resulting $v_0$ provides the minimum error in depth.

13. Example Minimum Depth Method ($v_0$: Well TDR–Constant, k: Given by User)

This method minimizes the error in depth. By inserting functions (68) and (48) into function (45) the summed squares of residuals can be written as in Equation (115):

$$S = \sum_{i=1}^{n} \frac{\mu_i}{m_i} \sum_{j=1}^{m_i} \omega_{i,j} \left( \frac{v_0}{k_i} \beta_{i,j} - (z_{i,j} - z_{c_i} \alpha_{i,j}) \right)^2, \quad (115)$$

$$\beta_{i,j} = \alpha_{i,j} - 1, \quad \alpha_{i,j} = e^{k(t_{i,j} - t_{c_i})}$$

where $t_{i,j}$ and $z_{i,j}$ are the input data in time and depth. To find the $v_0$, that gives the minimum error in depth, the minimum of function (115) is obtained. This is achieved by setting the partial derivative of S with respect to $v_0$ equal to zero, as in Equation (116):

$$\frac{\partial S}{\partial v_0} = 0 \quad (116)$$

$$\frac{\partial S}{\partial v_0} = \quad (117)$$

$$2 \left( v_0 \sum_{i=1}^{n} \frac{\mu_i}{m_i k_i^2} \sum_{j=1}^{m_i} \omega_{i,j} \beta_{i,j}^2 - \sum_{i=1}^{n} \frac{\mu_i}{m_i k_i} \sum_{j=1}^{m_i} \omega_{i,j} (z_{i,j} - z_{c_i} \alpha_{i,j}) \beta_{i,j} \right)$$

An expression for $v_0$, is obtained by inserting function (117) into function (116), as in Equation (118):

$$v_0 = \frac{\sum_{i=1}^{n} \frac{\mu_i}{m_i k_i} \sum_{j=1}^{m_i} \omega_{i,j}(z_{i,j} - z_{c_i}\alpha_{i,j}) \beta_{i,j}}{\sum_{i=1}^{n} \frac{\mu_i}{m_i k_i^2} \sum_{j=1}^{m_i} \omega_{i,j} \beta_{i,j}^2} \quad (118)$$

14. Example Minimum Velocity Method ($v_0$: Correction–Constant, k: Well TDR–Constant)

This method minimizes the error in velocity. By inserting functions (68) and (69) into function (45) the summed squares of residuals can be written as in Equation (119):

$$S_{v_0} = \sum_{i=1}^{n} \mu_i \left( v_0 - k \frac{z_{M_i} - z_{c_i} \varphi_i}{\delta_i} \right)^2, \quad (119)$$

$$\delta_i = \varphi_i - 1, \quad \varphi_i = e^{k(t_{B_i} - t_{c_i})}$$

where the known time at the base of the interval is $t = t_B$ and the depth given by the correction object is $z = z_M$.

$$S_k = \sum_{i=1}^{n} \frac{\mu_i}{m_i} \sum_{j=1}^{m_i} \omega_{i,j} \left( v_0 - k \frac{z_{i,j} - z_{c_i} \alpha_{i,j}}{\beta_{i,j}} \right)^2, \quad (120)$$

$$\beta_{i,j} = \alpha_{i,j} - 1, \quad \alpha_{i,j} = e^{k(t_{i,j} - t_{c_i})}$$

where $t_{i,j}$ and $z_{i,j}$ are the input data in time and depth. To find the combination of $v_0$ and k that gives the minimum error in velocity, the minimum of function (119) and (120) is obtained. This is achieved by setting the partial derivative of $S_{v_0}$ with respect to $v_0$ equal to zero and by setting the partial derivative of $S_k$ with respect to k equal to zero, as in Equation (121):

$$\frac{\partial S_{v_0}}{\partial v_0} = \frac{\partial S_k}{\partial k} = 0 \quad (121)$$

$$\frac{\partial S_{v_0}}{\partial v_0} = 2 \left( v_0 \sum_{i=1}^{n} \mu_i - k \sum_{i=1}^{n} \mu_i \frac{z_{M_i} - z_{c_i} \varphi_i}{\delta_i} \right) \quad (122)$$

$$\frac{\partial S_k}{\partial k} = 2 v_0 \sum_{i=1}^{n} \frac{\mu_i}{m_i} \sum_{j=1}^{m_i} \omega_{i,j} \left( \frac{(z_{i,j} - z_{c_i}\alpha_{i,j})(\beta_{i,j} - k(t_{i,j} - t_{c_i}))}{\beta_{i,j}^2} \right) - \quad (123)$$

$$2k \sum_{i=1}^{n} \frac{\mu_i}{m_i} \sum_{j=1}^{m_i} \omega_{i,j} \left( \frac{(z_{i,j} - z_{c_i}\alpha_{i,j})^2 (\beta_{i,j} - k(t_{i,j} - t_{c_i}))}{\beta_{i,j}^2} \right)$$

An expression for $v_0$ may be obtained by inserting function (122) into function (121), as in Equation (124):

$$v_0 = k \frac{\sum_{i=1}^{n} \mu_i \frac{z_{M_i} - z_{c_i} \varphi_i}{\delta_i}}{\sum_{i=1}^{n} \mu_i} \quad (124)$$

By using functions (121), (123) and (124) a relation that just is dependent on k is obtained, as in Equation (125):

$$\begin{cases} v_0 \sum_{i=1}^{n} \frac{\mu_i}{m_i} \sum_{j=1}^{m_i} \omega_{i,j} \left( \frac{(z_{i,j} - z_{c_i}\alpha_{i,j})(\beta_{i,j} - k(t_{i,j} - t_{c_i}))}{\beta_{i,j}^2} \right) - \\ k \sum_{i=1}^{n} \frac{\mu_i}{m_i} \sum_{j=1}^{m_i} \omega_{i,j} \left( \frac{(z_{i,j} - z_{c_i}\alpha_{i,j})^2 (\beta_{i,j} - k(t_{i,j} - t_{c_i}))}{\beta_{i,j}^2} \right) = 0 \\ v_0 = k \frac{\sum_{i=1}^{n} \mu_i \frac{z_{M_i} - z_{c_i} \varphi_i}{\delta_i}}{\sum_{i=1}^{n} \mu_i} \end{cases} \quad (125)$$

The transcendental nature of this relation prevents the isolation of k. A numerical method may be applied to find the root of this relation.

15. Example Minimum Velocity Method ($v_0$: Well TDR–Constant, k: Well TDR–Constant)

This method minimizes the error in velocity. By inserting function (68) and (57) into function (45) the summed squares of residuals can be written as in Equation (126):

$$S = \sum_{i=1}^{n} \frac{\mu_i}{m_i} \sum_{j=1}^{m_i} \omega_{i,j} \left( v_0 - k \frac{z_{i,j} - z_{c_i} \alpha_{i,j}}{\beta_{i,j}} \right)^2, \quad (126)$$

$$\beta_{i,j} = \alpha_{i,j} - 1, \quad \alpha_{i,j} = e^{k(t_{i,j} - t_{c_i})}$$

where $t_{i,j}$ and $z_{i,j}$ are the input data in time and depth. To find the combination of $v_0$ and k that gives the minimum error in velocity, the minimum of function (126) is obtained. This is achieved by setting the partial derivative of S with respect to $v_0$ and k equal to zero, as in Equation (127):

$$\frac{\partial S}{\partial v_0} = \frac{\partial S}{\partial k} = 0 \tag{127}$$

$$\frac{\partial S}{\partial v_0} = 2\left(v_0 \sum_{i=1}^{n} \frac{\mu_i}{m_i} \sum_{j=1}^{m_i} \omega_{i,j} - k \sum_{i=1}^{n} \frac{\mu_i}{m_i} \sum_{j=1}^{m_i} \omega_{i,j} \frac{(z_{i,j} - z_{c_i} \alpha_{i,j})}{\beta_{i,j}}\right) \tag{128}$$

$$\frac{\partial S}{\partial k_i} = 2v_0 \sum_{i=1}^{n} \frac{\mu_i}{m_i} \sum_{j=1}^{m_i} \omega_{i,j}\left(\frac{(z_{i,j} - z_{c_i}\alpha_{i,j})(\beta_{i,j} - k(t_{i,j} - t_{c_i}))}{\beta_{i,j}^2}\right) - \tag{129}$$

$$2k \sum_{i=1}^{n} \frac{\mu_i}{m_i} \sum_{j=1}^{m_i} \omega_{i,j}\left(\frac{(z_{i,j} - z_{c_i}\alpha_{i,j})^2 (\beta_{i,j} - k(t_{i,j} - t_{c_i}))}{\beta_{i,j}^2}\right)$$

An expression for $v_0$ is obtained by inserting function (128) into function (127), as in Equation (130):

$$v_0 = \frac{\sum_{i=1}^{n} \frac{\mu_i}{m_i} \sum_{j=1}^{m_i} \omega_{i,j} \frac{(z_{i,j} - z_{c_i}\alpha_{i,j})}{\beta_{i,j}}}{\sum_{i=1}^{n} \frac{\mu_i}{m_i} \sum_{j=1}^{m_i} \omega_{i,j}} \tag{130}$$

By using functions (127), (129) and (130) a relation that just is dependent on k is obtained, as in Equation (131):

$$\begin{cases} v_0 \sum_{i=1}^{n} \frac{\mu_i}{m_i} \sum_{j=1}^{m_i} \omega_{i,j}\left(\frac{(z_{i,j} - z_{c_i}\alpha_{i,j})(\beta_{i,j} - k(t_{i,j} - t_{c_i}))}{\beta_{i,j}^2}\right) - \\ k \sum_{i=1}^{n} \frac{\mu_i}{m_i} \sum_{j=1}^{m_i} \omega_{i,j}\left(\frac{(z_{i,j} - z_{c_i}\alpha_{i,j})^2 (\beta_{i,j} - k(t_{i,j} - t_{c_i}))}{\beta_{i,j}^2}\right) = 0 \\ v_0 = \frac{\sum_{i=1}^{n} \frac{\mu_i}{m_i} \sum_{j=1}^{m_i} \omega_{i,j} \frac{(z_{i,j} - z_{c_i}\alpha_{i,j})}{\beta_{i,j}}}{\sum_{i=1}^{n} \frac{\mu_i}{m_i} \sum_{j=1}^{m_i} \omega_{i,j}} \end{cases} \tag{131}$$

The transcendental nature of this relation prevents the isolation of k. A numerical method can be applied to find the root of this relation.

16. Example Minimum Velocity Method ($v_0$: Correction–Constant, k: Well TDR–Surface)

This method minimizes the error in velocity. By inserting functions (68) and (69) into function (45) the summed squares of residuals can be written as in Equation (132):

$$S_{v_0} = \sum_{i=1}^{n} \mu_i \left(v_0 - k_i \frac{z_{M_i} - z_{c_i} \varphi_i}{\delta_i}\right)^2, \tag{132}$$

$$\delta_i = \varphi_i - 1, \quad \varphi_i = e^{k_i(t_{B_i} - t_{c_i})}$$

where the known time at the base of the interval is $t=t_B$ and the depth given by the correction object is $z=z_M$ as shown in Equation (133):

$$S_k \sum_{i=1}^{n} \frac{\mu_i}{m_i} \sum_{j=1}^{m_i} \omega_{i,j}\left(v_0 - k_i \frac{z_{i,j} - z_{c_i} \alpha_{i,j}}{\beta_{i,j}}\right)^2, \tag{133}$$

$$\beta_{i,j} = \alpha_{i,j} - 1, \quad \alpha_{i,j} = e^{k_i(t_{i,j} - t_{c_i})}$$

where $t_{i,j}$ and $z_{i,j}$ are the input data in time and depth. To find the combination of $v_0$ and $k_1, k_2, \ldots, k_n$, that gives the minimum error in velocity, the minimum of function (132) and (133) is obtained. This is achieved by setting the partial derivative of $S_{v_0}$ with respect to $v_0$ equal to zero and by setting the partial derivative of $S_k$ with respect to $k_1, k_2, \ldots, k_n$ equal to zero, as in Equation (134):

$$\frac{\partial S_{v_0}}{\partial v_0} = \frac{\partial S_k}{\partial k_1} = \frac{\partial S_k}{\partial k_2} = \ldots = \frac{\partial S_k}{\partial k_n} = 0 \tag{134}$$

$$\frac{\partial S_{v_0}}{\partial v_0} = 2\left(v_0 \sum_{i=1}^{n} \mu_i - \sum_{i=1}^{n} \mu_i k_i \frac{z_{M_i} - z_{c_i} \varphi_i}{\delta_i}\right) \tag{135}$$

$$\frac{\partial S_k}{\partial k_i} = 2v_0 \frac{\mu_i}{m_i} \sum_{j=1}^{m_i} \omega_{i,j}\left(\frac{(z_{i,j} - z_{c_i}\alpha_{i,j})(\beta_{i,j} - k_i(t_{i,j} - t_{c_i}))}{\beta_{i,j}^2}\right) - \tag{136}$$

$$2\frac{k_i \mu_i}{m_i} \sum_{j=1}^{m_i} \omega_{i,j}\left(\frac{(z_{i,j} - z_{c_i}\alpha_{i,j})^2 (\beta_{i,j} - k_i(t_{i,j} - t_{c_i}))}{\beta_{i,j}^2}\right)$$

An expression for $v_0$ by is obtained by inserting function (135) into function (134), as in Equation (137):

$$v_0 = \frac{\sum_{i=1}^{n} \mu_i k_i \frac{z_{M_i} - z_{c_i} \varphi_i}{\delta_i}}{\sum_{i=1}^{n} \mu_i} \tag{137}$$

By using functions (134), (136) and (137) a relation that just is dependent on $k_1, k_2, \ldots, k_n$ is obtained, as in Equation (138):

$$\begin{cases} v_0 \frac{\mu_i}{m_i} \sum_{j=1}^{m_i} \omega_{i,j}\left(\frac{(z_{i,j} - z_{c_i}\alpha_{i,j})(\beta_{i,j} - k_i(t_{i,j} - t_{c_i}))}{\beta_{i,j}^2}\right) - \\ \frac{k_i \mu_i}{m_i} \sum_{j=1}^{m_i} \omega_{i,j}\left(\frac{(z_{i,j} - z_{c_i}\alpha_{i,j})^2 (\beta_{i,j} - k_i(t_{i,j} - t_{c_i}))}{\beta_{i,j}^2}\right) = 0 \\ v_0 = \frac{\sum_{i=1}^{n} \mu_i k_i \frac{z_{M_i} - z_{c_i} \varphi_i}{\delta_i}}{\sum_{i=1}^{n} \mu_i} \end{cases} \tag{138}$$

The transcendental nature of this relation prevents the isolation of $k_1, k_2, \ldots, k_n$. A numerical method must be applied to find the roots of this relation.

17. Example Minimum Velocity Method ($v_0$: Well TDR–Constant, k: Well TDR–Surface)

This method minimizes the error in velocity. By inserting functions (68) and (57) into function (45) the summed squares of residuals can be written as in Equation (139):

$$S = \sum_{i=1}^{n} \frac{\mu_i}{m_i} \sum_{j=1}^{m_i} \omega_{i,j} \left( v_0 - k_i \frac{z_{i,j} - z_{c_i} \alpha_{i,j}}{\beta_{i,j}} \right)^2, \quad (139)$$

$$\beta_{i,j} = \alpha_{i,j} - 1, \quad \alpha_{i,j} = e^{k_i(t_{i,j} - t_{c_i})}$$

where $t_{i,j}$ and $z_{i,j}$ are the input data in time and depth. To find the combination of $v_0$ and $k_1, k_2, k_n$ that gives the minimum error in velocity, the minimum of function (139) is obtained. This is achieved by setting the partial derivative of S with respect to $v_0$ and $k_1, k_2, \ldots, k_n$ equal to zero, as in Equation (140):

$$\frac{\partial S}{\partial v_0} = \frac{\partial S}{\partial k_1} = \frac{\partial S}{\partial k_2} = \ldots = \frac{\partial S}{\partial k_n} = 0 \quad (140)$$

$$\frac{\partial S}{\partial v_0} = 2 \left( v_0 \sum_{i=1}^{n} \frac{\mu_i}{m_i} \sum_{j=1}^{m_i} \omega_{i,j} - \sum_{i=1}^{n} \frac{k_i \mu_i}{m_i} \sum_{j=1}^{m_i} \omega_{i,j} \frac{(z_{i,j} - z_{c_i} \alpha_{i,j})}{\beta_{i,j}} \right) \quad (141)$$

$$\frac{\partial S}{\partial k_i} = 2 v_0 \frac{\mu_i}{m_i} \sum_{j=1}^{m_i} \omega_{i,j} \left( \frac{(z_{i,j} - z_{c_i} \alpha_{i,j})(\beta_{i,j} - k_i(t_{i,j} - t_{c_i}))}{\beta_{i,j}^2} \right) - \quad (142)$$

$$2 \frac{k_i \mu_i}{m_i} \sum_{j=1}^{m_i} \omega_{i,j} \left( \frac{(z_{i,j} - z_{c_i} \alpha_{i,j})^2 (\beta_{i,j} - k_i(t_{i,j} - t_{c_i}))}{\beta_{i,j}^2} \right)$$

An expression for $v_0$ may be obtained by inserting function (141) into function (140) to obtain Equation (143):

$$v_0 = \frac{\sum_{i=1}^{n} \frac{k_i \mu_i}{m_i} \sum_{j=1}^{m_i} \omega_{i,j} \frac{(z_{i,j} - z_{c_i} \alpha_{i,j})}{\beta_{i,j}}}{\sum_{i=1}^{n} \frac{\mu_i}{m_i} \sum_{j=1}^{m_i} \omega_{i,j}} \quad (143)$$

By using functions (140), (142) and (143) a relation that just is dependent on $k_1, k_2, \ldots, k_n$ is obtained, as in Equation (144):

$$\begin{cases} v_0 \frac{\mu_i}{m_i} \sum_{j=1}^{m_i} \omega_{i,j} \left( \frac{(z_{i,j} - z_{c_i} \alpha_{i,j})(\beta_{i,j} - k_i(t_{i,j} - t_{c_i}))}{\beta_{i,j}^2} \right) - \\ \frac{k_i \mu_i}{m_i} \sum_{j=1}^{m_i} \omega_{i,j} \left( \frac{(z_{i,j} - z_{c_i} \alpha_{i,j})^2 (\beta_{i,j} - k_i(t_{i,j} - t_{c_i}))}{\beta_{i,j}^2} \right) = 0 \\ v_0 = \frac{\sum_{i=1}^{n} \frac{k_i \mu_i}{m_i} \sum_{j=1}^{m_i} \omega_{i,j} \frac{(z_{i,j} - z_{c_i} \alpha_{i,j})}{\beta_{i,j}}}{\sum_{i=1}^{n} \frac{\mu_i}{m_i} \sum_{j=1}^{m_i} \omega_{i,j}} \end{cases} \quad (144)$$

The transcendental nature of this relation prevents the isolation of $k_1, k_2, \ldots, k_n$. A numerical method can be applied to find the roots of this relation.

18. Example Minimum Velocity Method ($v_0$: Correction–Surface, k: Well TDR–Constant)

This method minimizes the error in velocity. By inserting functions (68) and (57) into function (45) the summed squares of residuals can be written as in Equation (145):

$$S = \sum_{i=1}^{n} \frac{\mu_i}{m_i} \sum_{j=1}^{m_i} \omega_{i,j} \left( v_{0_i} - k \frac{z_{i,j} - z_{c_i} \alpha_{i,j}}{\beta_{i,j}} \right)^2, \quad (145)$$

$$\beta_{i,j} = \alpha_{i,j} - 1, \quad \alpha_{i,j} = e^{k_i(t_{i,j} - t_{c_i})}$$

where $t_{i,j}$ and $z_{i,j}$ are the input data in time and depth. To find the combination of $v_{0_1}, v_{0_2}, \ldots, v_{0_n}$ and k that gives the minimum error in velocity, the minimum of function (145) is obtained. This may be achieved by setting the partial derivative of S with respect to k equal to zero as in Equation (146):

$$\frac{\partial S}{\partial k} = 0 \quad (146)$$

$$\frac{\partial S}{\partial k} = \quad (147)$$

$$2 \sum_{i=1}^{n} \frac{\mu_i v_{0_i}}{m_i} \sum_{j=1}^{m_i} \omega_{i,j} \left( \frac{(z_{i,j} - z_{c_i} \alpha_{i,j})(\beta_{i,j} - k(t_{i,j} - t_{c_i}))}{\beta_{i,j}^2} \right) -$$

$$2k \sum_{i=1}^{n} \frac{\mu_i}{m_i} \sum_{j=1}^{m_i} \omega_{i,j} \left( \frac{(z_{i,j} - z_{c_i} \alpha_{i,j})^2 (\beta_{i,j} - k(t_{i,j} - t_{c_i}))}{\beta_{i,j}^2} \right)$$

In this method $v_{0_1}, v_{0_2}, \ldots, v_{0_n}$ is found by using function (68) with the known time at the base of the interval $t = t_3$ and the depth given by the correction object $z = z_M$. This provides the following expression for $v_{0_1}, v_{0_2}, \ldots, v_{0_n}$ in Equation (148):

$$v_{0_i} = k_i \frac{z_{M_i} - z_{c_i} \varphi_i}{\delta_i}, \quad \delta_i = \varphi_i - 1, \quad \varphi_i = e^{k_i(t_{B_i} - t_{c_i})} \quad (148)$$

By using functions (146), (147) and (148) a relation is obtained that just is dependent of k, as shown in Equation (149):

$$\begin{cases} \sum_{i=1}^{n} \frac{\mu_i v_{0_i}}{m_i} \sum_{j=1}^{m_i} \omega_{i,j} \left( \frac{(z_{i,j} - z_{c_i} \alpha_{i,j})(\beta_{i,j} - k(t_{i,j} - t_{c_i}))}{\beta_{i,j}^2} \right) \\ k \sum_{i=1}^{n} \frac{\mu_i}{m_i} \sum_{j=1}^{m_i} \omega_{i,j} \left( \frac{(z_{i,j} - z_{c_i} \alpha_{i,j})^2 (\beta_{i,j} - k(t_{i,j} - t_{c_i}))}{\beta_{i,j}^2} \right) = 0 \\ v_{0_i} = k_i \frac{z_{M_i} - z_{c_i} \varphi_i}{\delta_i} \end{cases} \quad (149)$$

The transcendental nature of this relation prevents the isolation of k. A numerical method can be applied to find the root of this relation.

19. Example Minimum Velocity Method ($v_0$: Well TDR–Surface, k: Well TDR–Constant)

This method minimizes the error in velocity. By inserting functions (68) and (57) into function (45) the summed squares of residuals can be written as in Equation (150):

$$S = \sum_{i=1}^{n} \frac{\mu_i}{m_i} \sum_{j=1}^{m_i} \omega_{i,j} \left( v_{0_i} - k \frac{z_{i,j} - z_{c_i} \alpha_{i,j}}{\beta_{i,j}} \right)^2, \quad (150)$$

$$\beta_{i,j} = \alpha_{i,j} - 1, \quad \alpha_{i,j} = e^{k(t_{i,j} - t_{c_i})}$$

where $t_{i,j}$ and $z_{i,j}$ are the input data in time and depth. To find the combination of $v_{0_1}, v_{0_2}, \ldots, v_{0_n}$ and k that gives the minimum error in velocity, the minimum of function (150) is obtained. This can be achieved by setting the partial derivative of S with respect to $v_{0_1}, v_{0_2}, \ldots, v_{0_n}$ and k equal to zero, as in Equation (151):

$$\frac{\partial S}{\partial v_{0_1}} = \frac{\partial S}{\partial v_{0_2}} = \ldots = \frac{\partial S}{\partial v_{0_n}} = \frac{\partial S}{\partial k} = 0 \quad (151)$$

$$\frac{\partial S}{\partial v_{0_i}} = 2 \frac{\mu_i}{m_i} \left( v_{0_i} \sum_{j=1}^{m_i} \omega_{i,j} - k \sum_{j=1}^{m_i} \omega_{i,j} \frac{(z_{i,j} - z_{c_i} \alpha_{i,j})}{\beta_{i,j}} \right) \quad (152)$$

$$\frac{\partial S}{\partial k} = 2 \sum_{i=1}^{n} \frac{\mu_i v_{0_i}}{m_i} \sum_{j=1}^{m_i} \omega_{i,j} \left( \frac{(z_{i,j} - z_{c_i} \alpha_{i,j})(\beta_{i,j} - k(t_{i,j} - t_{c_i}))}{\beta_{i,j}^2} \right) - \quad (153)$$

$$2k \sum_{i=1}^{n} \frac{\mu_i}{m_i} \sum_{j=1}^{m_i} \omega_{i,j} \left( \frac{(z_{i,j} - z_{c_i} \alpha_{i,j})^2 (\beta_{i,j} - k(t_{i,j} - t_{c_i}))}{\beta_{i,j}^2} \right)$$

An expression for $v_{0_1}, v_{0_2}, \ldots, v_{0_n}$ is obtained by inserting function (152) into function (151), as in Equation (154):

$$v_{0_i} = k \frac{\sum_{j=1}^{m_i} \omega_{i,j} \frac{(z_{i,j} - z_{c_i} \alpha_{i,j})}{\beta_{i,j}}}{\sum_{j=1}^{m_i} \omega_{i,j}} \quad (154)$$

By using functions (150), (153) and (154) a relation is obtained that just is dependent on k, as in Equation (155):

$$\begin{cases} \sum_{i=1}^{n} \frac{\mu_i v_{0_i}}{m_i} \sum_{j=1}^{m_i} \omega_{i,j} \left( \frac{(z_{i,j} - z_{c_i} \alpha_{i,j})(\beta_{i,j} - k(t_{i,j} - t_{c_i}))}{\beta_{i,j}^2} \right) \\ k \sum_{i=1}^{n} \frac{\mu_i}{m_i} \sum_{j=1}^{m_i} \omega_{i,j} \left( \frac{(z_{i,j} - z_{c_i} \alpha_{i,j})^2 (\beta_{i,j} - k(t_{i,j} - t_{c_i}))}{\beta_{i,j}^2} \right) = 0 \\ v_{0_i} = k \frac{\sum_{j=1}^{m_i} \omega_{i,j} \frac{(z_{i,j} - z_{c_i} \alpha_{i,j})}{\beta_{i,j}}}{\sum_{j=1}^{m_i} \omega_{i,j}} \end{cases} \quad (155)$$

The transcendental nature of this relation prevents the isolation of k. But a numerical method can be applied to find the root of this relation.

20. Example Minimum Velocity Method ($v_0$: Given by user, k: Well TDR–Constant)

This method minimizes the error in velocity. By inserting functions (68) and (57) into function (45) the summed squares of residuals can be written as in Equation (156):

$$S = \sum_{i=1}^{n} \frac{\mu_i}{m_i} \sum_{j=1}^{m_i} \omega_{i,j} \left( v_{0_i} - k \frac{z_{i,j} - z_{c_i} \alpha_{i,j}}{\beta_{i,j}} \right)^2, \quad (156)$$

$$\beta_{i,j} = \alpha_{i,j} - 1,$$

$$\alpha_{i,j} = e^{k(t_{i,j} - t_{c_i})}$$

where $t_{i,j}$ and $z_{i,j}$ are the input data in time and depth. To find the k that gives the minimum error in velocity, the minimum of function (156) is obtained. This is achieved by setting the partial derivative of S with respect to k equal to zero, as in Equation (157):

$$\frac{\partial S}{\partial k} = 0 \quad (157)$$

$$\frac{\partial S}{\partial k} = 2 \sum_{i=1}^{n} \frac{\mu_i v_{0_i}}{m_i} \sum_{j=1}^{m_i} \omega_{i,j} \left( \frac{(z_{i,j} - z_{c_i} \alpha_{i,j})(\beta_{i,j} - k(t_{i,j} - t_{c_i}))}{\beta_{i,j}^2} \right) - \quad (158)$$

$$2k \sum_{i=1}^{n} \frac{\mu_i}{m_i} \sum_{j=1}^{m_i} \omega_{i,j} \left( \frac{(z_{i,j} - z_{c_i} \alpha_{i,j})^2 (\beta_{i,j} - k(t_{i,j} - t_{c_i}))}{\beta_{i,j}^2} \right)$$

By using functions (157) and (158) a relation that just is dependent on k is obtained, as in Equation (159):

$$\sum_{i=1}^{n} \frac{\mu_i v_{0_i}}{m_i} \sum_{j=1}^{m_i} \omega_{i,j} \left( \frac{(z_{i,j} - z_{c_i} \alpha_{i,j})(\beta_{i,j} - k(t_{i,j} - t_{c_i}))}{\beta_{i,j}^2} \right) - \quad (159)$$

$$k \sum_{i=1}^{n} \frac{\mu_i}{m_i} \sum_{j=1}^{m_i} \omega_{i,j} \left( \frac{(z_{i,j} - z_{c_i} \alpha_{i,j})^2 (\beta_{i,j} - k(t_{i,j} - t_{c_i}))}{\beta_{i,j}^2} \right) = 0$$

The transcendental nature of this relation prevents the isolation of k. A numerical method may be applied to find the root of this relation.

21. Example Minimum Velocity Method ($v_0$: Correction–Constant, k: Given by user)

This method minimizes the error in velocity. By inserting functions (68) and (69) into function (45) the summed squares of residuals can be written as in Equation (160):

$$S = \sum_{i=1}^{n} \mu_i \left( v_0 - k_i \frac{z_{M_i} - z_{c_i} \varphi_i}{\delta_i} \right)^2, \quad \delta_i = \varphi_i - 1, \quad \varphi_i = e^{k_i(t_{B_i} - t_{c_i})} \quad (160)$$

where the known time at the base of the interval is $t = t_B$ and the depth given by the correction object is $z = z_M$. To find the $v_0$ that gives the minimum error in velocity, the minimum of function (160) is obtained. This is achieved by setting the partial derivative of S with respect to $v_0$ equal to zero, as in Equation (161):

$$\frac{\partial S}{\partial v_0} = 0 \quad (161)$$

$$\frac{\partial S}{\partial v_0} = 2\left(v_0 \sum_{i=1}^{n} \mu_i - \sum_{i=1}^{n} \mu_i k_i \frac{z_{M_i} - z_{c_i}\varphi_i}{\delta_i}\right) \quad (162)$$

An expression for $v_0$, may be obtained by inserting function (162) into function (161), as in Equation (163):

$$v_0 = \frac{\sum_{i=1}^{n} \mu_i k_i \frac{z_{M_i} - z_{c_i}\varphi_i}{\delta_i}}{\sum_{i=1}^{n} \mu_i} \quad (163)$$

The resulting $v_0$ provides the minimum error in velocity.

22. Example Minimum Velocity Method ($v_n$: Well TDR–Constant, k: Given by User)

This method minimizes the error in velocity. By inserting functions (68) and (57) into function (45) the summed squares of residuals can be written as in Equation (164):

$$S = \sum_{i=1}^{n} \frac{\mu_i}{m_i} \sum_{j=1}^{m_i} \omega_{i,j} \left(v_0 - k_i \frac{z_{i,j} - z_{c_i}\alpha_{i,j}}{\beta_{i,j}}\right)^2, \quad (164)$$

$$\beta_{i,j} = \alpha_{i,j} - 1,$$

$$\alpha_{i,j} = e^{k(t_{i,j} - t_{c_i})}$$

where $t_{i,j}$ and $z_{i,j}$ are the input data in time and depth. To find the $v_0$ that gives the minimum error in velocity, the minimum of function (164) is obtained. This is achieved by setting the partial derivative of S with respect to $v_0$ equal to zero, as in Equation (165):

$$\frac{\partial S}{\partial v_0} = 0 \quad (165)$$

$$\frac{\partial S}{\partial v_0} = 2\left(v_0 \sum_{i=1}^{n} \frac{\mu_i}{m_i} \sum_{j=1}^{m_i} \omega_{i,j} - \sum_{i=1}^{n} \frac{\mu_i k_i}{m_i} \sum_{j=1}^{m_i} \omega_{i,j} \frac{(z_{i,j} - z_{c_i}\alpha_{i,j})}{\beta_{i,j}}\right) \quad (166)$$

An expression for $v_0$ can be obtained by inserting function (166) into function (165), as shown in Equation (167):

$$v_0 = \frac{\sum_{i=1}^{n} \frac{\mu_i k_i}{m_i} \sum_{j=1}^{m_i} \omega_{i,j} \frac{(z_{i,j} - z_{c_i}\alpha_{i,j})}{\beta_{i,j}}}{\sum_{i=1}^{n} \frac{\mu_i}{m_i} \sum_{j=1}^{m_i} \omega_{i,j}} \quad (167)$$

Example Method for a Set of Wells

Figure 17:
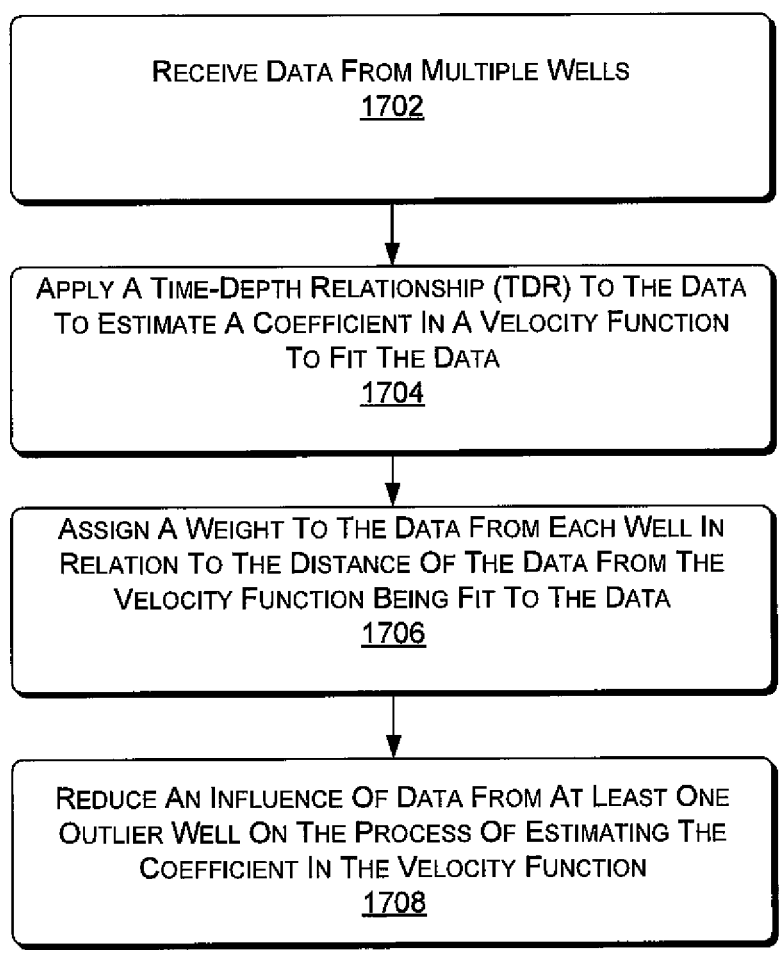
FIG. 17 is a flow diagram of an example method of reducing the influence of outlier wells on a velocity model for a set of wells.

FIG. 17 shows an example method of reducing the influence of outlier wells on a velocity model for a set of wells. In the flow diagram, the operations are summarized in individual blocks. The example method 1700 may be performed by hardware or combinations of hardware and software, for example, by the example velocity modeler 202.

At block 1702, data is received from multiple wells.

At block 1704, a time-depth relationship (TDR) is applied to the data, for estimating at least one coefficient in a velocity function to fit the data.

At block 1706, a weight is assigned to the data from each well in relation to the distance of the data from the velocity function being fit to the data.

At block 1708, the influence of the data from one or more outlier wells is reduced so that the outlier data does not negatively influence the process of estimating the coefficient(s) in the velocity function.

The velocity function used to fit or describe the data may be an interval velocity function, a linear velocity in depth function or a linear velocity in time function. Applying the time-depth relationship (TDR) may include employing a minimum depth method or a minimum velocity method as part of estimating the coefficients for the velocity function.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

APPENDIX A

The analytic linear velocity in time function can written as $$v = v_0 + kt \quad (168)$$

where $v_0$ is the instantaneous velocity at the datum and k is the rate of increase of velocity. The instantaneous velocity can be written as a function of time and depth.

$$v = \frac{dz}{dt} \quad (169)$$

By inserting function (168) into function (169), Equation (170) is obtained:

$$\frac{dz}{dt} = v_0 + kt \quad (170)$$

This differential equation can be solved by using integration $$\int dz = \int (v_0 + kt) dt \quad (171)$$

The solution of the integrals is $$z = v_0 t + \frac{1}{2} kt^2 + c \quad (172)$$

where c is an unknown constant. The constant can be found by inserting a boundary condition. It is common to set the boundary values equal to the time and depth at the top of the layer ($=t_T$ and $z_c = z_T$). By doing that, Equation (173) is obtained:

$$c = z_c - v_0 t_c - \frac{1}{2}k t_c^2 \quad (173)$$

By inserting function (173) into function (172) it can be shown that the depth z can be expressed as a function of time t $$z = z_c + v_0(t - t_c) + \frac{1}{2}k(t^2 - t_c^2) \quad (174)$$

where $t_c$ and $z_c$ are the time and depth boundary values. It is common to set the boundary values equal to time and depth at the top of the layer ($t_c = t_T$ and $z_c = z_T$).

APPENDIX B

The bi-square weights method is a well-known technique that minimizes a weighted sum of squares. The method follows the following procedure:

Step 1: Fit the model by using the weights, shown in Equation (175):

$$\omega = \omega^{user}\omega^{robust} \quad (175)$$

Step 2: Compute the adjusted residuals and standardize them.

The adjusted residuals are given In Equation (176):

$$r_j^{adj} = \frac{r_j}{\sqrt{1-h_j}} \quad (176)$$

where $r_j$ are the residuals, and $h_j$ are leverages that adjust the residual by down-weighting high-leverage data points, which have a large effect on the fit, as in Equation (177):

$$h_j = \frac{1}{m} + \frac{(t_j - \bar{t})^2}{\sum_{i=1}^{m}(t_i - \bar{t})^2} \quad (177)$$

The standardized adjusted residuals are given in Equation (178):

$$u_j = \frac{r_j^{adj}}{Ks} \quad (178)$$

K is a tuning constant equal to 4.685, and s is the robust variance given by MAD/0.6745 where MAD is the median absolute deviation of the residuals.

Step 3: Compute the robust weights as a function of u.
The bi-square weights are given in Equation (179):

$$\omega_j^{robust} = \begin{cases} (1-u_j^2)^2, & |u_j| < 1 \\ 0, & |u_j| \geq 1 \end{cases} \quad (179)$$

Step 4: Check the convergence.
If the fit converges, then the method is finished. Otherwise, perform the next iteration of the fitting procedure by returning to the first step.

APPENDIX C

One instantaneous velocity function is the interval velocity $$v = v_0 \quad (180)$$

where $v_0$ is the instantaneous velocity at the datum. The instantaneous velocity can be written as a function of time and depth.

$$v = \frac{dz}{dt} \quad (181)$$

Inserting function (180) into function (181) yields:

$$\frac{dz}{dt} = v_0 \quad (182)$$

This differential equation can be solved by using integration $$\int \frac{1}{v_0} dz = \int dt \quad (183)$$

The solution of the integrals is $$z = v_0(t+c) \quad (184)$$

where c is an unknown constant. The constant can be found by inserting a boundary condition. It is common to set the boundary values equal to the time and depth at the top of the layer ($t_c = t_T$ and $z_c = z_T$). This results in $$c = \frac{z_c}{v_0} - t_c \quad (185)$$

By inserting function (185) into function (184) the depth z can be expressed as a function of time t $$z = z_c + v_0(t - t_c) \quad (186)$$

where $t_c$ and $z_c$ are the time and depth boundary values. It is common to set the boundary values equal to the time and depth at the top of the layer ($t_c = t_T$ and $z_c = z_T$).

APPENDIX D

One possible analytic instantaneous velocity function is the linear velocity $$v = v_0 + kz \quad (187)$$

where $v_0$ is the instantaneous velocity at the datum and k is the rate of increase of velocity. The instantaneous velocity can be written as a function of time and depth.

$$v = \frac{dz}{dt} \quad (188)$$

Inserting function (187) into function (188) yields:

$$\frac{dz}{dt} = v_0 + kz \qquad (189)$$

This differential equation can be solved by using integration $$\int \left(\frac{1}{v_0 + kz}\right) dz = \int dt \qquad (190)$$

The solution of the integrals is $$z = \frac{1}{k}(e^{k(t+c)} - v_0) \qquad (191)$$

where c is an unknown constant. The constant can be found by inserting a boundary condition. The boundary values can be set equal to the time and depth at the top of the layer ($t_c = t_T$ and $z_c = z_T$). This results in $$c = \frac{1}{k}\ln(v_0 + kz_c) - t_c \qquad (192)$$

Inserting function (192) into function (191) yields:

$$z = \frac{v_0}{k}(e^{k(t-t_c)} - 1) + z_c e^{k(t-t_c)} \qquad (193)$$

where $t_c$ and $z_c$ are the time and depth boundary values. It is common to set the boundary values equal to the time and depth at the top of the layer ($t_c = t_T$ and $z_c = z_T$).

The invention claimed is:

1. A non-transitory computer-readable storage medium, containing instructions, which when executed by a computer perform a process, comprising:
 receiving data from multiple wells;
 applying a time-depth relationship (TDR) to the data, for estimating unknown coefficients in a velocity function to fit the data; and
 reducing an influence of outlier data from at least one outlier well on estimating the unknown coefficients by introducing weights of a robust iteratively re-weighted least squares algorithm to weight data of each of the multiple wells.

2. The non-transitory computer-readable storage medium of claim 1, wherein the robust iteratively re-weighted least squares algorithm comprises a bi-square method to minimize a weighted sum of squares, in which the weights given to the data are related to distances between the data and the linear-velocity-in-time function being fit to the data.

3. The non-transitory computer-readable storage medium of claim 2, wherein the weights decrease with respect to increasing distance.

4. The non-transitory computer-readable storage medium of claim 1, wherein the velocity function to fit the data comprises an interval velocity function.

5. The non-transitory computer-readable storage medium of claim 1, wherein the velocity function to fit the data comprises one of a linear velocity in depth function or a linear velocity in time function.

6. The non-transitory computer-readable storage medium of claim 1, wherein coefficient estimation for the analytic velocity function is achieved by one of a minimum depth method or a minimum velocity method.

7. The non-transitory computer-readable storage medium of claim 1, containing instructions, which when executed by a computer perform a process comprising applying the robust iteratively re-weighted least squares algorithm for re-weighting the weights.

8. The non-transitory computer-readable storage medium of claim 1, wherein the weights weight residuals of the multiple wells.

9. The non-transitory computer-readable storage medium of claim 8, wherein the residual comprise depth residuals.

10. The non-transitory computer-readable storage medium of claim 8, wherein the residual comprise velocity residuals.

11. The non-transitory computer-readable storage medium of claim 8, containing instructions, which when executed by a computer perform a process comprising minimizing a sum of squares of iteratively re-weighted residuals.

12. The non-transitory computer-readable storage medium of claim 11 wherein the minimizing comprises applying a bi-square method to minimize the sum of squares of the iteratively re-weighted residuals.

13. The non-transitory computer-readable storage medium of claim 12 wherein the minimizing acts to reduce the influence of the outlier data from at least one outlier well by iteratively re-weighting the residual for that at least one outlier well.

14. The non-transitory computer-readable storage medium of claim 1, containing instructions, which when executed by a computer perform setting a partial derivative of a summed squares of weighted residuals with respect to instantaneous velocity ($v_0$) equal to zero, wherein each of the weighted residuals corresponds to a respective one of the multiple wells.

15. The non-transitory computer-readable storage medium of claim 14, containing instructions, which when executed by a computer perform optimizing the time-depth relationship for estimating the unknown coefficients based at least in part on setting the partial derivative equal to zero.

16. The non-transitory computer-readable storage medium of claim 15 wherein the velocity function comprises a linear-velocity-in-depth function and the optimizing provides for the instantaneous velocity ($v_0$) of the linear-velocity-in-depth function.

17. The non-transitory computer-readable storage medium of claim 1 wherein the velocity function comprises a linear-velocity-in-depth function $v = v_0 + kz$, where $v_0$ comprises an instantaneous velocity and k comprises a rate of increase of velocity or a compaction factor.

18. The non-transitory computer-readable storage medium of claim 1, containing instructions, which when executed by a computer perform applying a bi-square method to minimize a weighted sum of squares of residuals, wherein each residual is associated with a respective one of the multiple wells and wherein the bi-square method comprises a tuning constant (K) and a parameter (s), which is the robust variance dependent on the median absolute deviation of the residuals.

19. The non-transitory computer-readable storage medium of claim 1, containing instructions, which when executed by a computer perform an assessment of a reservoir using the velocity function.

20. A non-transitory computer-readable storage medium, containing instructions, which when executed by a computer perform a process, comprising:

receiving data from multiple wells;

applying a time-depth relationship (TDR) to the data, for estimating unknown coefficients in a velocity function to fit the data; and reducing an influence of outlier data from at least one outlier well on estimating the unknown coefficients, wherein reducing the influence of the outlier data from at least one outlier well further includes assigning a data weight to the data from each well, including applying a bi-square method to minimize a weighted sum of squares, in which a weight given to the data from a well is related to how far the data of the well is from the linear-velocity-in-time function being fit to the data.

* * * * *